(12) United States Patent
Nitsche et al.

(10) Patent No.: US 7,484,946 B2
(45) Date of Patent: Feb. 3, 2009

(54) METHOD AND ASSEMBLY FOR LOCATING MATERIAL WITHIN A STRUCTURE

(75) Inventors: Olaf Nitsche, Rochester Hills, MI (US); Eric White, Wales Township, MI (US); Abraham Kassa, Shelby Township, MI (US); Jeffrey R. Apfel, Shelby Township, MI (US); Erin Matthew White, Wales Township, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 11/463,662

(22) Filed: Aug. 10, 2006

(65) Prior Publication Data

US 2007/0042066 A1 Feb. 22, 2007

Related U.S. Application Data

(60) Provisional application No. 60/771,713, filed on Feb. 9, 2006, provisional application No. 60/709,947, filed on Aug. 19, 2005.

(51) Int. Cl.
 *B29C 70/00* (2006.01)
(52) U.S. Cl. ............... 425/4 R; 425/110; 425/817 R
(58) Field of Classification Search ............ 425/4 R, 425/817 R, 110, DIG. 14, 4 C; 249/65, 83, 249/91, 93; 269/48.1, 51; 428/319.1, 319.3; 296/204, 205, 187.02; 264/41, 45.5, 514, 264/263; 366/204, 207, 232
See application file for complete search history.

(56) References Cited

U.S. PATENT DOCUMENTS

| | | | |
|---|---|---|---|
| 1,814,667 A | 7/1931 | Fennema | |
| 3,208,102 A * | 9/1965 | Rubio | ............ 425/2 |
| 3,400,182 A | 9/1968 | Kolt | |
| 4,029,128 A | 6/1977 | Yamagishi | |
| 4,269,890 A | 5/1981 | Breitling et al. | |
| 4,385,024 A * | 5/1983 | Tansill | ............ 264/223 |
| 4,610,836 A | 9/1986 | Wycech | |
| 4,751,249 A | 6/1988 | Wycech | |
| 4,769,391 A | 9/1988 | Wycech | |
| 4,810,548 A | 3/1989 | Ligon, Sr. et al. | |
| 4,836,516 A | 6/1989 | Wycech | |
| 4,923,902 A | 5/1990 | Wycech | |
| 5,040,803 A | 8/1991 | Cieslik et al. | |

(Continued)

FOREIGN PATENT DOCUMENTS

CA 913319 10/1972

(Continued)

OTHER PUBLICATIONS

Lilley et al. Comparison of Preformed Acoustic Baffles and Two-Component Polyurethan Foams for Filling Body Cavities.

(Continued)

*Primary Examiner*—Philip C Tucker
*Assistant Examiner*—Dimple N Bodawala
(74) *Attorney, Agent, or Firm*—Dobrusin & Thennisch PC

(57) ABSTRACT

There is disclosed a method and assembly for locating a material adjacent or with a structure of an article of manufacture such as an automotive vehicle. The assembly typically includes a first compartment, a second compartment and a mixing initiator.

1 Claim, 25 Drawing Sheets

U.S. PATENT DOCUMENTS

| | | |
|---|---|---|
| 5,102,188 A | 4/1992 | Yamane |
| 5,160,465 A | 11/1992 | Soderberg |
| 5,344,208 A | 9/1994 | Bien et al. |
| 5,358,397 A | 10/1994 | Ligon et al. |
| 5,678,826 A | 10/1997 | Miller |
| 5,804,608 A | 9/1998 | Nakazato et al. |
| 5,878,784 A | 3/1999 | Sales et al. |
| 5,931,474 A | 8/1999 | Chang et al. |
| 6,053,210 A | 4/2000 | Chapman et al. |
| 6,093,358 A | 7/2000 | Schiewe et al. |
| 6,254,488 B1 | 7/2001 | Hill |
| 6,284,360 B1 * | 9/2001 | Johnson et al. .......... 428/317.7 |
| 6,315,938 B1 | 11/2001 | Jandali |
| 6,319,964 B1 | 11/2001 | Blank et al. |
| 6,321,793 B1 | 11/2001 | Czaplicki et al. |
| 6,382,635 B1 | 5/2002 | Fitzgerald |
| 6,422,575 B1 | 7/2002 | Czaplicki et al. |
| 6,444,713 B1 | 9/2002 | Pachl et al. |
| 6,706,222 B2 | 3/2004 | Gallagher et al. |
| 6,880,657 B2 | 4/2005 | Schneider et al. |
| 7,011,315 B2 | 3/2006 | Czaplicki et al. |
| 7,141,194 B1 | 11/2006 | Beckmann |
| 7,144,071 B2 | 12/2006 | Le Gall et al. |
| 2002/0066254 A1 | 6/2002 | Ebbinghaus |
| 2002/0096833 A1 | 7/2002 | Czaplicki et al. |
| 2003/0140671 A1 | 7/2003 | Lande et al. |
| 2003/0201572 A1 | 10/2003 | Coon et al. |
| 2003/0209921 A1 | 11/2003 | Coon et al. |
| 2003/0218019 A1 | 11/2003 | Le Gall et al. |
| 2004/0074150 A1 | 4/2004 | Wycech |
| 2004/0135058 A1 | 7/2004 | Wycech |
| 2005/0081383 A1 | 4/2005 | Kosal et al. |
| 2005/0087899 A1 | 4/2005 | Coon et al. |
| 2005/0126848 A1 | 6/2005 | Siavoshai |
| 2005/0127145 A1 | 6/2005 | Czaplicki et al. |
| 2005/0172486 A1 | 8/2005 | Carlson et al. |
| 2005/0181084 A1 | 8/2005 | Anders et al. |
| 2005/0194706 A1 | 9/2005 | Kosal et al. |
| 2005/0212326 A1 | 9/2005 | Marion |
| 2006/0057333 A1 | 3/2006 | Brahim |
| 2006/0267378 A1 | 11/2006 | Czaplicki et al. |
| 2006/0272884 A1 | 12/2006 | Vilcek et al. |
| 2007/0122510 A1 | 5/2007 | Mendiboure et al. |

FOREIGN PATENT DOCUMENTS

| | | |
|---|---|---|
| DE | 3826011 | 2/1990 |
| DE | 38 38 655 | 5/1990 |
| DE | 4039135 | 6/1992 |
| DE | 299 04 705 U1 | 6/1999 |
| EP | 0 268 810 | 6/1988 |
| EP | 0 453 777 | 10/1991 |
| EP | 0 383 498 | 3/1993 |
| EP | 1 134 126 B1 | 3/2001 |
| EP | 1 208 954 A2 | 5/2002 |
| EP | 1 362 683 | 11/2003 |
| EP | 1 428 744 | 6/2004 |
| EP | 1 591 224 | 11/2005 |
| FR | 2115177 | 7/1972 |
| FR | 2 539 693 | 7/1984 |
| JP | 58-87668 | 6/1983 |
| JP | 59-214628 | 12/1984 |
| JP | 61 205109 | 9/1986 |
| JP | 63-231913 | 9/1988 |
| JP | 01 069 308 | 3/1989 |
| JP | 01 069 309 | 3/1989 |
| JP | 01 164 867 | 6/1989 |
| JP | 4-158009 | 6/1992 |
| JP | 406156317 A | 6/1994 |
| JP | 7-31569 | 7/1995 |
| WO | WO87/01978 | 4/1987 |
| WO | WO93/05103 | 9/1992 |
| WO | WO 93/05103 | 3/1993 |
| WO | WO 96/11095 | 4/1996 |
| WO | WO97/02967 | 1/1997 |
| WO | WO96/22324 | 5/1997 |
| WO | WO98/36944 | 8/1998 |
| WO | WO99/36243 | 7/1999 |
| WO | WO99/64287 | 12/1999 |
| WO | WO01/19667 | 3/2001 |
| WO | WO01/71225 | 9/2001 |
| WO | WO03/047951 | 6/2003 |
| WO | WO 03/061934 | 7/2003 |
| WO | WO03/089221 | 10/2003 |
| WO | WO2004/078451 | 9/2004 |
| WO | WO2004/113153 | 12/2004 |
| WO | WO2005/077634 | 8/2005 |
| WO | WO2005/105405 | 11/2005 |

OTHER PUBLICATIONS

Lilley et al., Vehicle Acoustic Solutions.
Copending U.S. Appl. No. 10/718,509, filed Nov. 20, 2003.
Copending U.S. Appl. No. 10/806,309, filed Mar. 22, 2004.
Copending Patent Application Serial No. GB 0220945.0 filed Sep. 10, 2002.
Copending Patent Application Serial No. EP 0300159.1 filed Jan. 6, 2003.
Copending U.S. Appl. No. 11/188,679, filed Jul. 25, 2005.
Copending U.S. Appl. No. 11/189,190, filed Jul. 26, 2005.
Copending U.S. Appl. No. 60/709,947, filed Aug. 19, 2005.
Copending U.S. Appl. No. 60/711,101, filed Aug. 25, 2005.
Copending U.S. Appl. No. 11/254,129, filed Oct. 19, 2005.
Copending U.S. Appl. No. 60/753,973, filed Dec. 23, 2005.
Copending U.S. Appl. No. 11/339,431, filed Jan. 25, 2006.
Copending U.S. Appl. No. 60/771,713, filed Feb. 9, 2006.
Copending U.S. Appl. No. 11/390,658, filed Mar. 28, 2006.
Copending U.S. Appl. No. 11/391,884, filed Mar. 29, 2006.
Copending U.S. Appl. No. 11/339,535, filed Mar. 30, 2006.
Copending U.S. Appl. No. 11/393,431, filed Mar. 30, 2006.
Copending U.S. Appl. No. 11/401,207, filed Apr. 10, 2006.
Copending U.S. Appl. No. 11/381,769, filed May 5, 2006.
Copending U.S. Appl. No. 60/746,810, filed May 9, 2006.
Copending U.S. Appl. No. 60/747,677, filed May 19, 2006.
Copending U.S. Appl. No. 60/804,117, filed Jun. 7, 2006.
Copending U.S. Appl. No. 11/422,705, filed Jun. 7, 2006.
Copending U.S. Appl. No. 60/820,295, filed Jul. 25, 2006.
Copending U.S. Appl. No. 10/597,610, filed Aug. 1, 2006.
Copending U.S. Appl. No. 11/461,557, filed Aug. 1, 2006.
International Search Report, Dec. 15, 2006.

* cited by examiner

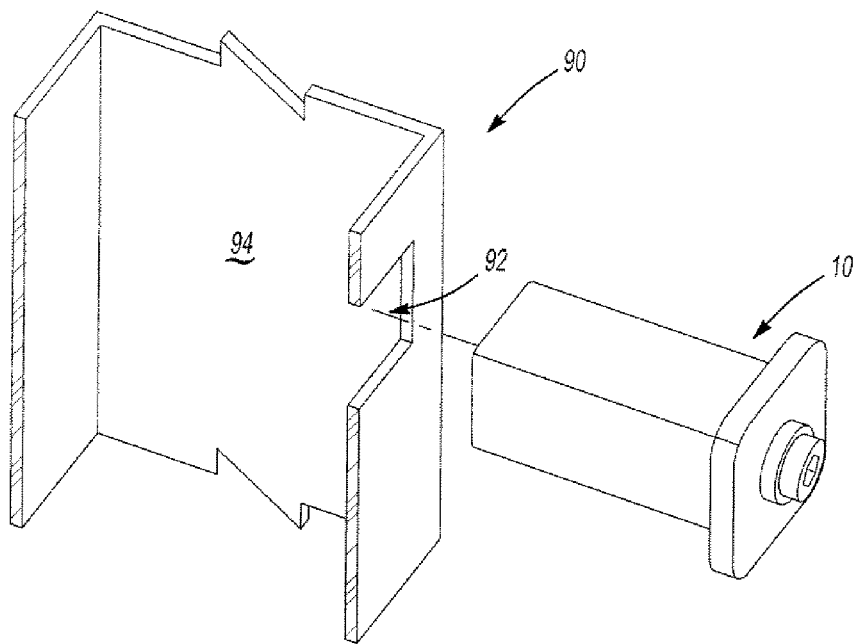
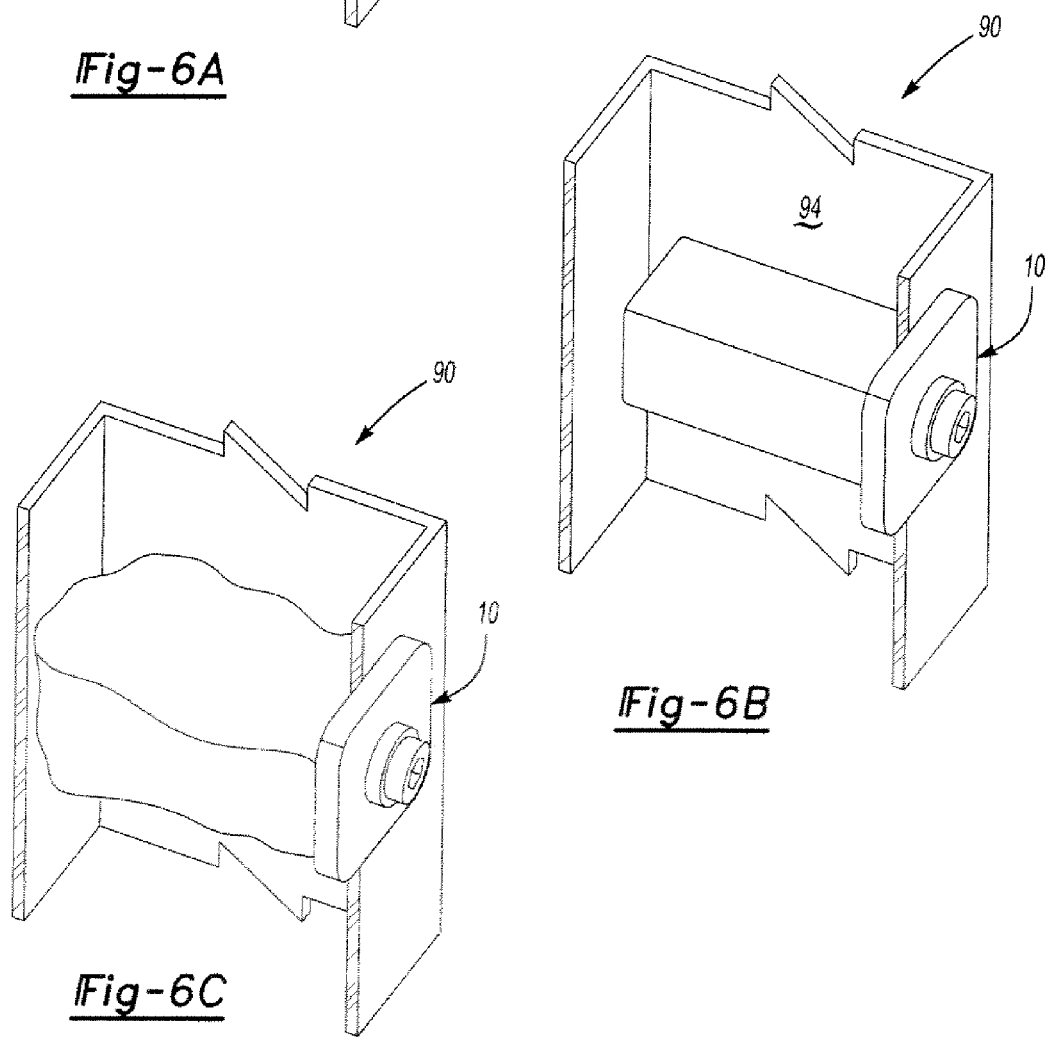
Fig-6A
Fig-6B
Fig-6C

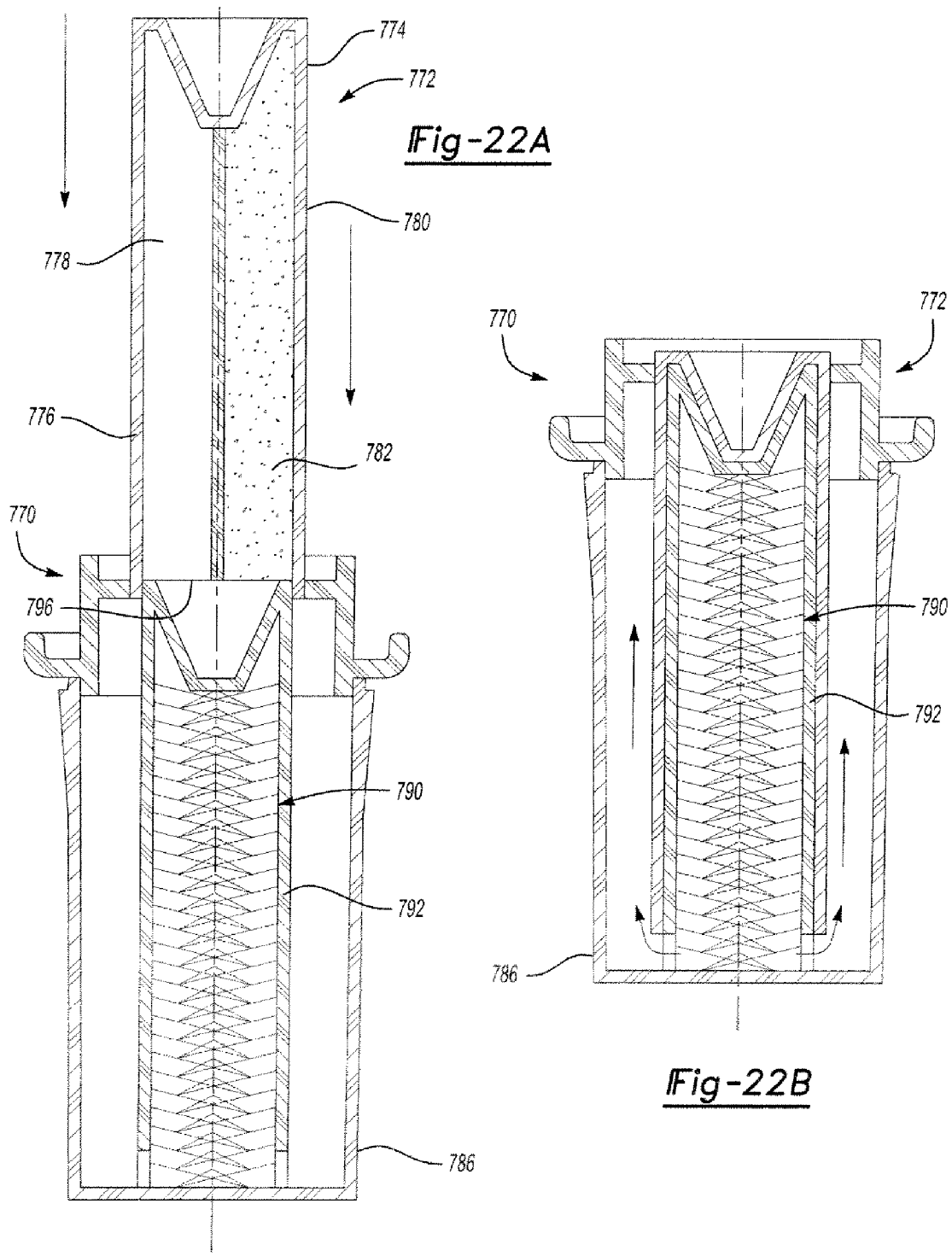

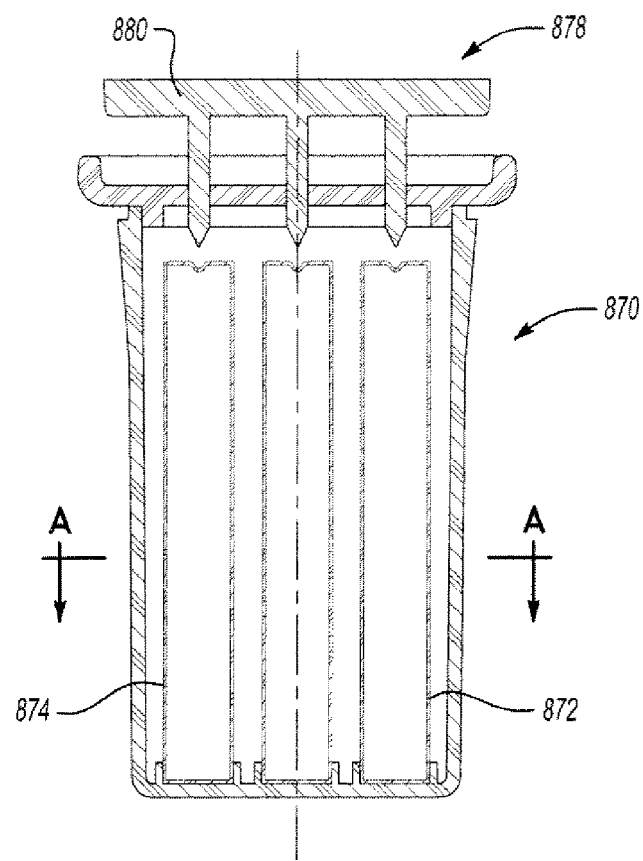
*Fig-24B*
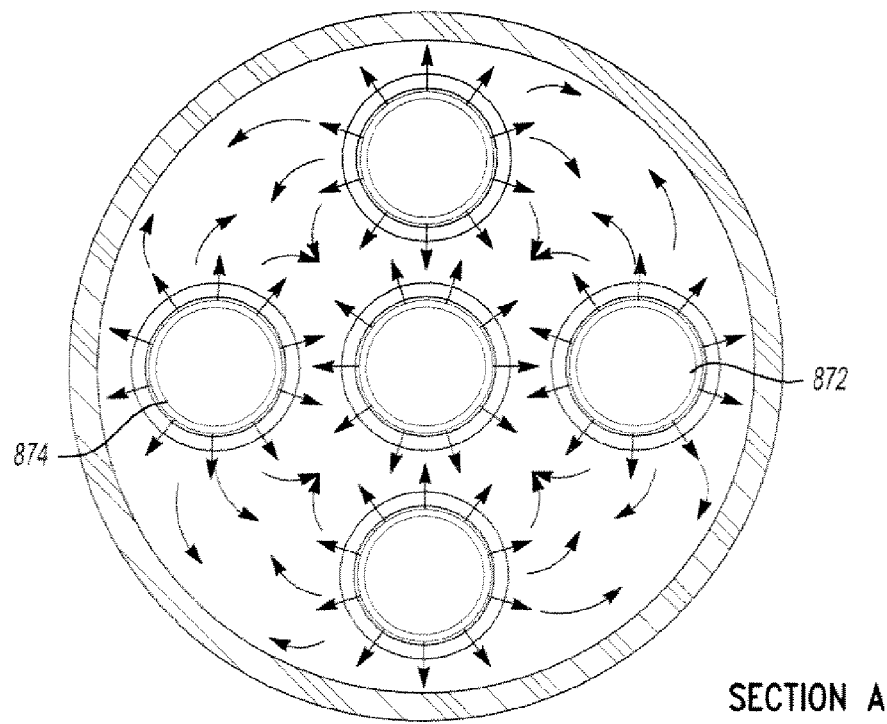
SECTION A

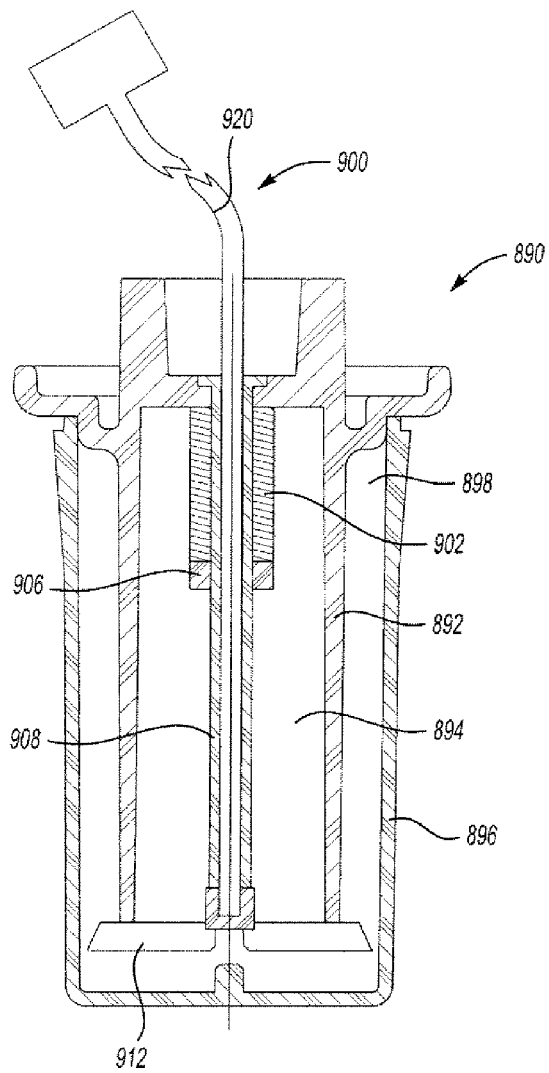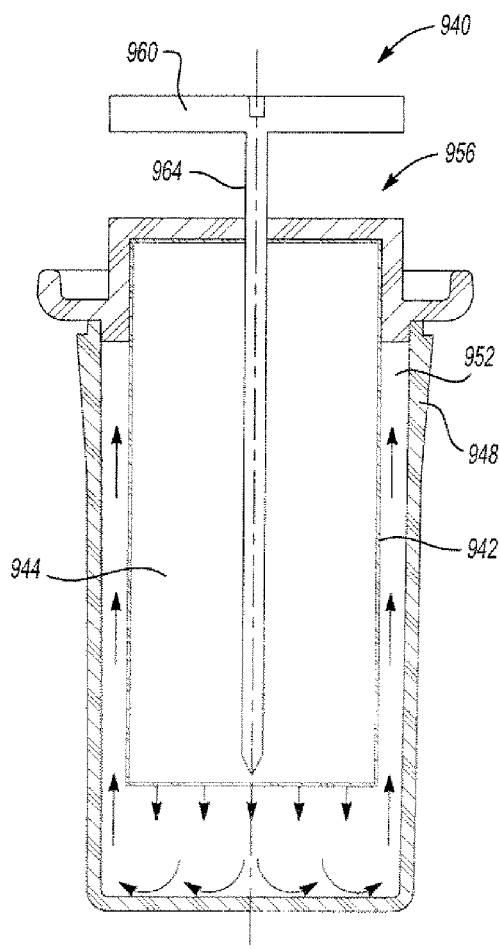
Fig-25
Fig-26

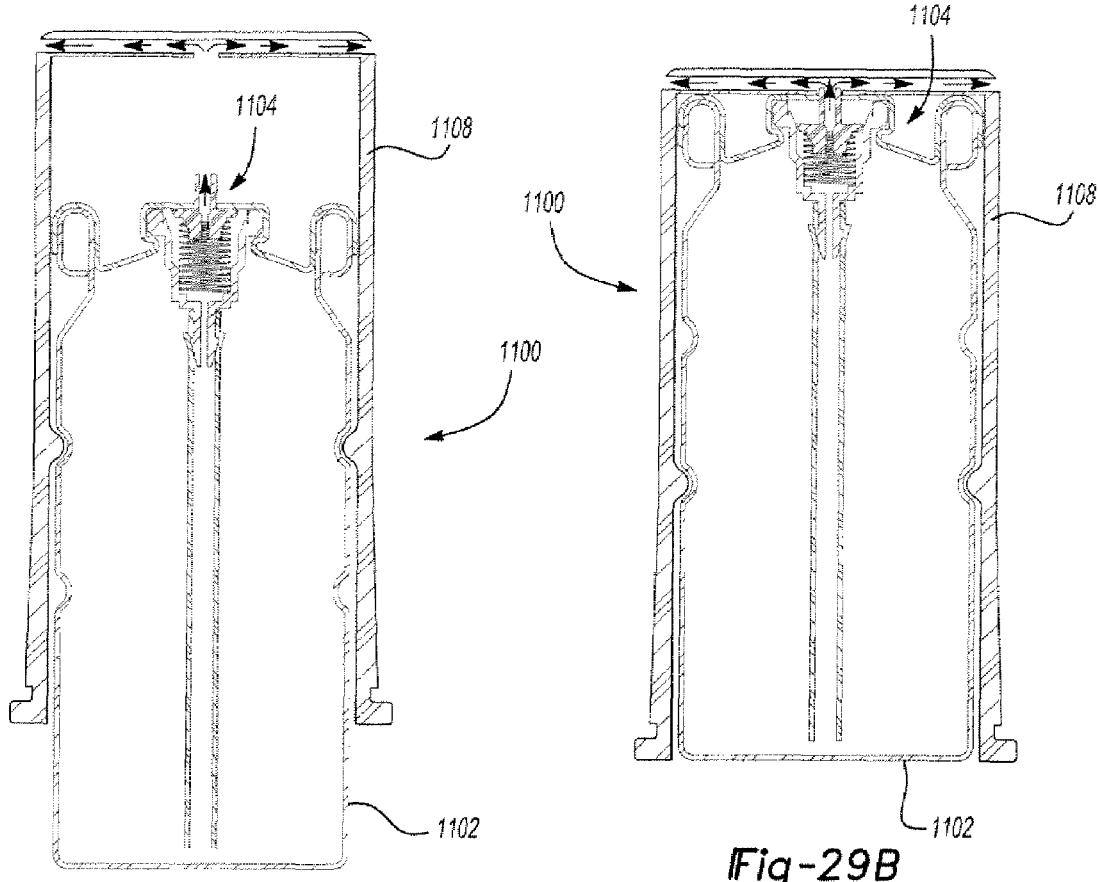
Fig-29A
Fig-29B
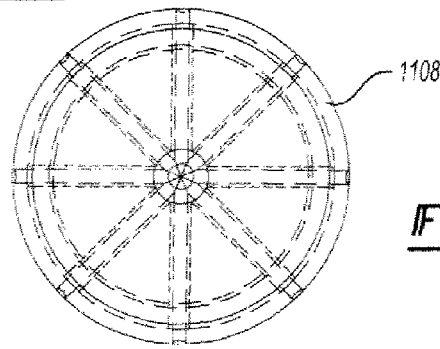
Fig-29C

US 7,484,946 B2

METHOD AND ASSEMBLY FOR LOCATING MATERIAL WITHIN A STRUCTURE

CLAIM OF PRIORITY

This application claims the benefit of the filing dates of U.S. Provisional Application Nos. 60/709,947 filed Aug. 19, 2005 and 60/771,713 filed Feb. 9, 2006.

FIELD OF THE INVENTION

The present invention relates to a method and system or assembly for locating material such as foam within or adjacent a structure of an article of manufacture (e.g., an automotive vehicle).

BACKGROUND OF THE INVENTION

Industry (e.g., the transportation industry) has developed numerous methods and assembly for placement of materials adjacent, within and/or upon surfaces of structure of articles of manufacture such as transportation vehicles (e.g., trains, boats and particularly automotive vehicle). Such materials can provide a variety of functional attribute to the articles such as sound reduction, baffling, reinforcement, sealing, adhesion, decoration, damping, combinations thereof or the like. Such methods and assemblies can suffer from several drawbacks. For example, some methods and assemblies can require an undesirable amount of equipment to be located adjacent to an assembly location (e.g., an automotive assembly line) for the articles. As another example, some methods and assembly can require application of materials at an undesirable time during assembly of the articles. Thus, the present invention provides a method and assembly of applying materials that overcomes one or both of the aforementioned drawbacks or alternatively overcomes or drawbacks or provides particular advantages or alternatives relative to previous methods or assemblies.

SUMMARY OF THE INVENTION

Accordingly, there is disclosed a system for forming a baffle, seal or reinforcement within a structure of an automotive vehicle. The system typically includes a first compartment and a second compartment with a first component located in the first compartment and a second component located in the second compartment. The system also typically includes a mixing initiator associated with the first compartment, the second compartment or both wherein, the mixing initiator applies a force causing intermixing of the first component and the second component to form an admixture that expands, foams, and cures to form a foam that functions as a baffle, seal or reinforcement in a cavity of a structure.

The first component and the second component are typically comprised of one or more of a polymeric material, a curing agent, a blowing agent or a combination thereof. The compartments can be defined by one or more housings and one or more divider walls.

BRIEF DESCRIPTION OF THE DRAWINGS

The features and inventive aspects of the present invention will become more apparent upon reading the following detailed description, claims, and drawings, of which the following is a brief description:

FIGS. 6A-6C illustrate an exemplary application of the exemplary assembly of FIGS. 1-6.

FIGS. 19A-30 illustrate embodiments of the invention having additional and/or alternative features, designs and configurations.

DETAILED DESCRIPTION OF THE PREFERRED EMBODIMENT

Figure 1:
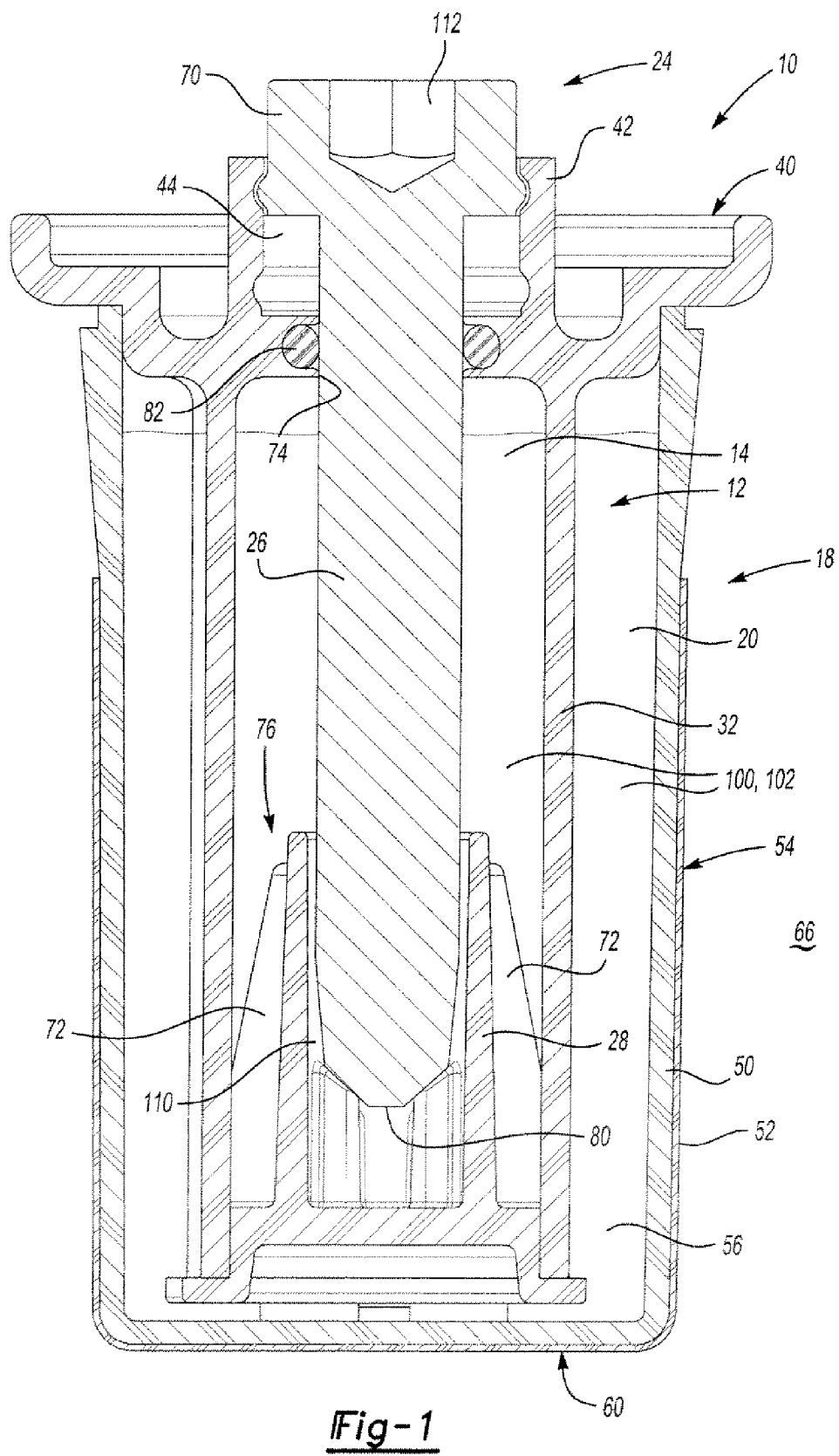
FIG. 1 is a sectional view of an exemplary assembly according to one aspect of the present invention.
Figure 2:
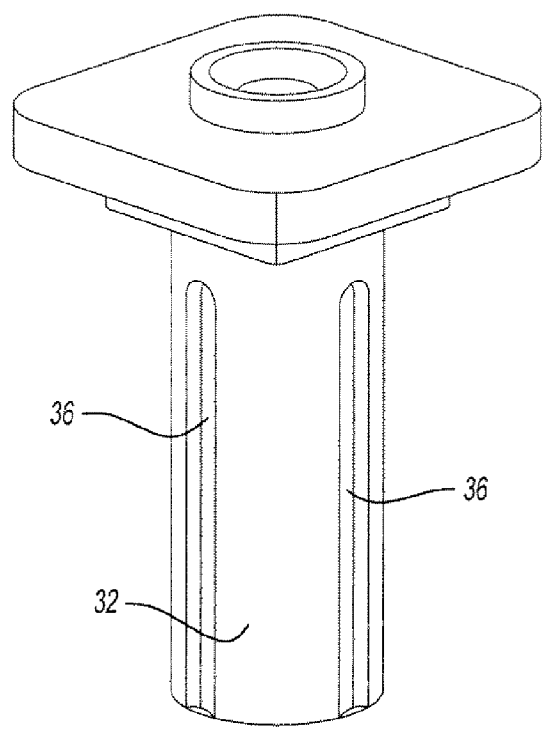
FIGS. 2-6 are perspective views of the exemplary components of the exemplary assembly of FIG. 1.
Figure 3:
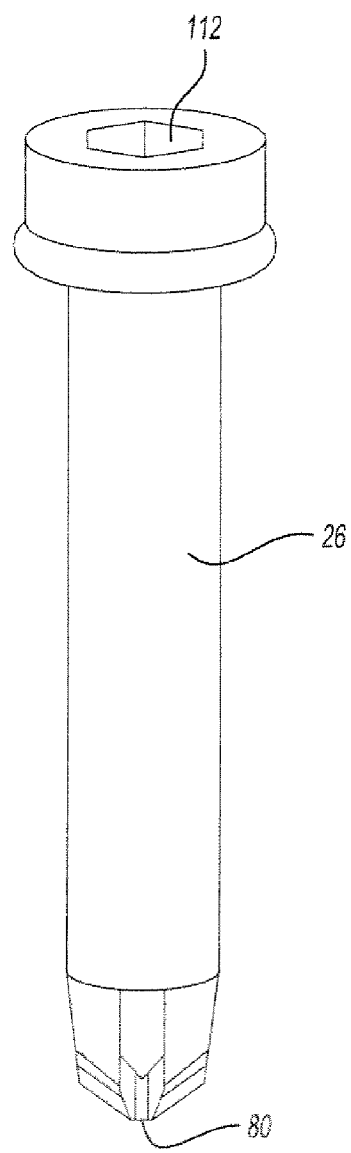
Figure 4:
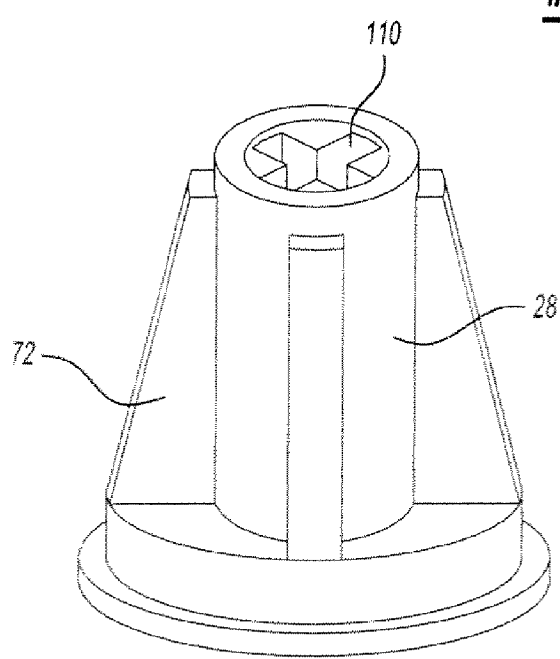
Figure 5:
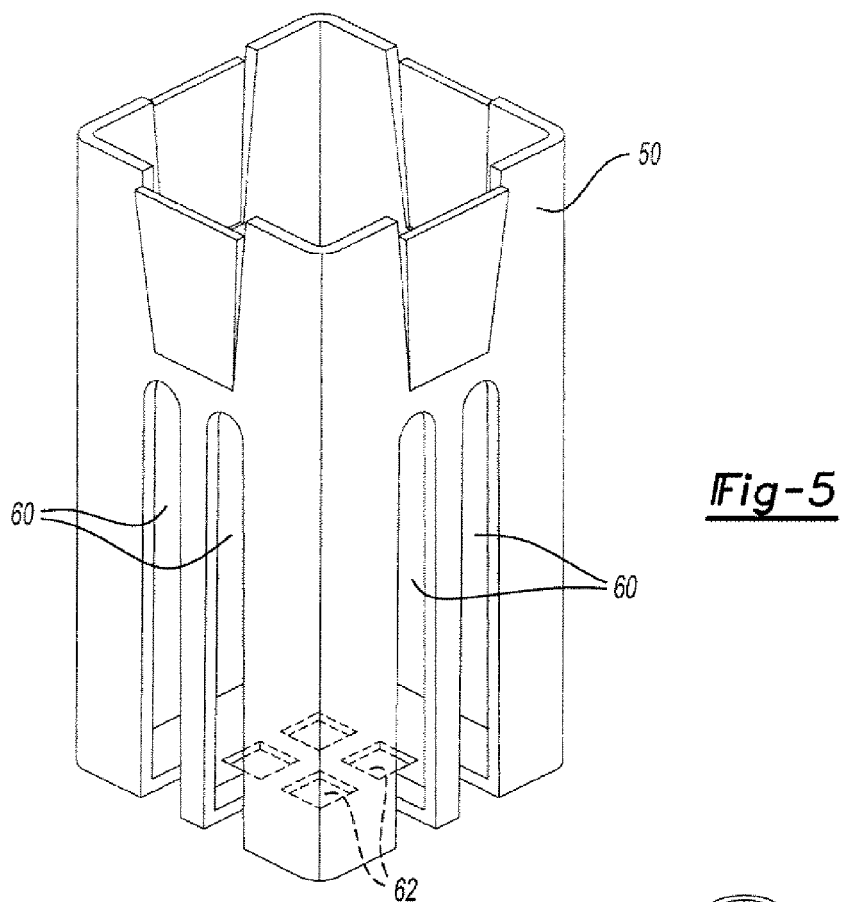

The present invention is predicated upon the provision of a method and/or an assembly or system for locating a material such as a foam or adhesive material adjacent a surface (e.g., within a cavity) of a structure of an article of manufacture. The assembly and method may be employed to apply a material to a variety of structures of articles of manufacture such as structure of marine vehicles (e.g., boats), trains, aerospace vehicles (e.g., airplanes), appliances, buildings (e.g., skyscrapers or homes), construction, furniture or the like. The assembly and method have been found particularly useful for applying a material, particularly a foam or adhesive material, to structures of automotive vehicles. The materials applied via the assembly and method are typically useful for providing adhesion, sealing, baffling, reinforcement or the like to the structure of the article of manufacture.

Typically, the assembly will include one or more of the following:
  i. at least one first compartment containing a polymeric material, which may include one type of polymer or a mixture of two or more polymers, although not required;
  ii. at least one second compartment containing a curing agent wherein the curing agent is maintained separate from the polymeric material;
  iii. optionally, a blowing agent; and/or
  iv. a mixing initiator, which can include one or multiple members, one or more of which are typically movable (e.g., rotatable, actuatable, combinations thereof or the like).

Typically, the method will employ the assembly or a variation thereof for accomplishing one or more of the following:

i. locating the polymeric material, the curing agent, the blowing agent or a combination thereof adjacent, upon or adhered to a surface of a structure (e.g., within a cavity of a structure);

ii. intermixing the polymeric material, the curing agent and, optionally depending upon the desired result, the blowing agent using the mixing initiator (e.g., by moving the movable member of the initiator) to form an admixture of activatable material that activates to form a desired activated material (e.g., a cured adhesive or foam) adjacent, upon or adhered to the surface of the structure (e.g, within the cavity of the structure).

The material to be located adjacent or within a structure according to the present invention is typically an activatable material that forms an activated material. Generally, an activatable material for the present invention is a material that activates to expand, foam, cure (e.g., cross-link, thermoset or otherwise), whet, adhere or any combination thereof to form the activated material. The activatable materials may activate by exposure to a condition such as heat or moisture. Preferably, however, the activatable materials activate due to chemical interaction or reaction between components (e.g., the polymeric material, the curing agent, the blowing agent or a combination thereof) of the activatable material. Of course, exposure to a condition may cause chemical interaction or reaction as well.

Activatable Material

The activatable material of the present invention will typically be comprised of a first component and a second component which are mixed to form the activatable material. Upon mixing, the activatable material typically activates to form an activated material as described. For purposes of the present invention an activatable material can be in the process of activating and still be an activatable material. For mixing purposes, the first and second components are typically in substantially liquid form, although not required.

The first component of the activatable material will typically include a polymeric material, which may be substantially formed of one polymer or may be an admixture of multiple (e.g., 2, 3, 4, or more) different polymers. The second component of the activatable material will typically include a curing agent, a blowing agent or both. A blowing agent could alternatively or additionally be included in the first component. It is also contemplated that the curing agent and blowing agent may be the same such that a single chemical ingredient may cure (e.g., cross-link or thermoset) the polymeric material while also acting as a blowing agent and at least assisting in forming gas (e.g., $CO_2$) within the polymeric material for forming the polymeric material into a cellular foam.

Exemplary polymers suitable for use singly or in combination as the polymeric material include, without limitation, halogenated polymers, polycarbonates, polyketones, urethanes, polyesters, polyols, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other additional or alternative potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly (methyl methacrylate), poly(vinyl acetate), poly(vinylidene chloride), polytetrafluoroethylene, polyisoprene, polyacrylamide, polyacrylic acid, polymethacrylate, combinations thereof or the like.

As discussed, activation of the activatable material may be initiated in a variety of ways. According to a preferred embodiment, the activatable material is chemically activated upon intermixing of the first component and the second component. The skilled artisan will understand that a variety of two component systems may be employed within the scope of the present invention and only a few preferred systems are disclosed herein.

According to one preferred embodiment, the first component includes a polymeric material that includes one or an admixture of polymers selected from epoxy resins, polyolefins, acetates, acrylates, combinations thereof or others. The second component will then include a curing agent capable of curing (e.g., cross-linking and/or thermosetting) the polymers. Example of suitable curing agent include, without limitation, acids, amines, amides, amidos, sulfur, oxides (e.g., peroxides) combinations thereof or the like. Preferably, the curing agents assist the expandable material in curing by crosslinking of the polymers, epoxy resins (e.g., by reacting in stoichiometrically excess amounts of curing agent with the epoxide groups on the resins) or both. It is also preferable for the curing agents to assist in thermosetting the expandable material. Useful classes of curing agents are materials selected from aliphatic or aromatic amines or their respective adducts, amidoamines, polyamides, cycloaliphatic amines, (e.g., anhydrides, polycarboxylic polyesters, isocyanates, phenol-based resins (such as phenol or cresol novolak resins, copolymers such as those of phenol terpene, polyvinyl phenol, or bisphenol-A formaldehyde copolymers, bishydroxyphenyl alkanes or the like), peroxides or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g. a modified or unmodified urea such as methylene diphenyl bis urea, an imidazole or a combination thereof) may also be provided for preparing the expandable material.

In such an embodiment, a blowing agent, when included, can be included in the first component or the second component. The blowing agent can be a physical blowing agent, a chemical blowing agent or other. For example, the blowing agent may be configure to chemically decompose and liberate gas bubbles upon exposure to the polymeric material, the curing agent or another ingredient of the activatable material or by exposure to a condition such as heat. Examples of suitable blowing agents include azodicarbonamide, dinitrosopentamethylenetetramine, 4,4,-oxy-bis (benzenesulphonylhydrazide), trihydrazinotriazine and N,N,-dimethyl-N,N,-dinitrosoterephthalamide. As an alternative example, the blowing agent may be a thermoplastic shell surrounding a chemical (e.g. a solvent core) that evaporates and expands the thermoplastic shell that is melting or softening due to heat produced by an exotherm from the interaction of the polymeric material with the curing agent or other interaction or production of heat. Examples of such blowing agents are sold under the tradename EXPANCEL commercially available from Expancel Inc., 2240 Northmont Parkway, Duluth, Ga., 30096 or Expancel, Box 13000, S-850 13 Sundsvall, Sweden. Examples of these types of systems are disclosed in U.S. Pat. Nos. 5,648,401; 6,706,772; 6,730,713; 6,787,579; 6,890,964 and U.S. Patent Application No. 2005/0016677 all of which are incorporated in their entireties.

In an alternative embodiment, the activatable material typically includes a first component that includes a polymeric material of one or more polyols or other isocyanate reactive resins or compounds and a second component that includes a curing agent of one or more isocyanates (e.g., toluene diisocyanate (TDI), methylene bisphenyl isocyanate, combinations thereof or the like). Typically, upon mixing, such components will produce a polyurethane, although not required. As used herein, the term "isocyanate" is meant to refer to any chemical compound or molecule that includes one or more isocyanate (NCO) groups, whether blocked or unblocked. The first or second component may also include a blowing agent.

Suitable polyol type polymers for the polymeric material include, without limitation, various isocyanate reactive compounds that typically include from about 1 to about 8 or more isocyanate-reactive groups and preferably from about 2 to about 6 isocyanate-reactive groups. Suitable compounds include polyacetals, polycarbonates, polyesterethers, polyester carbonates, hydrocarbons polythioethers, polyamides, polyols (e.g., di- or polyhydric alcohols) such as polyethers, glycols, polyesters and castor oil, polyesteramides, polysiloxanes, polybutadienes, and polyacetones. The isocyanate-reactive compounds typically contain from about 2 or fewer to about 4 or greater reactive amino or hydroxyl groups. Isocyanate-reactive compounds can be included in the isocyanate-reactive component in an amount of from about 5 to about 100% by weight (based on total weight of isocyanate-reactive component), more typically from about 10 to about 90% by weight and even more typically from about 40 to about 80% by weight. Some of the above isocyanate-reactive compounds can create a blowing effect by liberating a gas (e.g., $CO_2$) upon reaction with the isocyanate, but alternatively or additionally a blowing agent may be employed.

Exemplary isocyanates include, without limitation, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3-and-1,4-diisocyanate, and mixtures of these isomers; 1-isocyanato-3,3,5-trimethyl-5-isocyanatomethyl-cyclohexane ("isophorone diisocyanate"); 2,4- and 2,6-hexahydrotoluene diisocyanate and mixtures of these isomers; dicyclohexylmethane-4,4'-diisocyanate ("hydrogenated MDI", or "HMDI"); 1,3- and 1,4-phenylene diisocyanate; 2,4- and 2,6-toluene diisocyanate and mixtures of these isomers ("TDI"); diphenylmethane-2,4'- and/or -4,4'-diisocyanate ("MDI"); naphthylene-1,5-diisocyanate; triphenyl-methane-4,4',4"-triisocyanate; polyphenyl-polymethylene-polyisocyanates of the type which may be obtained by condensing aniline with formaldehyde, followed by phosgenation ("crude MDI"), norbornane diisocyanates; m- and p-isocyanatophenyl sulfonylisocyanates; perchlorinated aryl polyisocyanates; modified polyisocyanates containing carbodiimide groups; modified polyisocyanates containing urethane groups; modified polyisocyanates containing allophanate groups; modified polyisocyanates containing isocyanurate groups; modified polyisocyanates containing urea groups; polyisocyanates containing biuret groups; polyisocyanates obtained by telomerization reactions; polyisocyanates containing ester groups; reaction products of the above-mentioned isocyanates with acetals; and polyisocyanates containing polymeric fatty acid groups. It is also possible to use the isocyanate-containing distillation residues accumulating in the production of isocyanates on a commercial scale, optionally in solution in one or more of the polyisocyanates mentioned above. It is also possible to use mixtures of the polyisocyanates described above.

Some particularly readily available polyisocyanates include, without limitation, 2,4- and 2,6-toluene diisocyanates and mixtures of these isomers ("TDI"); polyphenyl-polymethylene-polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups, or biuret groups ("modified polyisocyanates").

Suitable blowing or foaming agents for use in the preparation of polyurethane or other foams include water and/or readily volatile organic substances. Organic blowing agents include acetone, ethyl acetate, methanol, ethanol, low-boiling hydrocarbons (such as butane, hexane, or heptane) or fluorocarbons, chlorofluorocarbons, hydrochlorofluorocarbons, or other halogen-substituted alkanes (such as methylene chloride, chloroform, ethylidene chloride, vinylidene chloride, monofluorotrichloro-methane, chlorodifluoromethane, and dichlorodifluoromethane), dimer acids, diethyl ether, or carboxylic acids (such as lactic acid, citric acid, and malonic acid), as well as carbon dioxide generated by the hydrolysis of isocyanate groups or reaction of isocyanate group with water.

A blowing effect may also be obtained by adding compounds which decompose at temperatures above room temperature and thereby give off gases such as nitrogen (for example, azo compounds such as azoisobutyronitrile or carbon dioxide (such as dimethyl dicarbonate). The blowing agent may include one or more nitrogen containing groups such as amides, amines and the like. Examples of other suitable blowing agents include azodicarbonamide, dinitrosopentamethylenetetramine, azodicarbonamide, dinitrosopentamethylenetetramine, 4,4$_i$-oxy-bis-(benzenesulphonylhydrazide), trihydrazinotriazine and N,N$_i$-dimethyl-N,N$_i$-dinitrosoterephthalamide. Additional blowing agents can include hydrates such as aluminum trihydrate and calcium sulfate hydrates, zeolites, molecular sieves or the like.

The blowing agent, when included, is generally included in the isocyanate-reactive component in an amount of from about 0.05 to about 10% by weight, based on total weight of isocyanate-reactive component, preferably from about 0.1 to about 6% by weight, most preferably from about 0.5 to about 5% by weight.

Other additives, agents or performance modifiers may also be included in the expandable material as desired, including but not limited to a blowing agent accelerator, a curing agent accelerator, a UV resistant agent, a flame retardant, an impact modifier, a heat stabilizer, a UV photoinitiator, a colorant, a processing aid, an anti-oxidant, a lubricant, a coagent, a reinforcement (e.g., chopped or continuous glass, glass fiber, ceramics and ceramic fibers, aramid fibers, aramid pulp, carbon fiber, acrylate fiber, polyamide fiber, polypropylene fibers, combinations thereof or the like). It is also contemplated that the expandable material may include an anti-oxidant such as a propionate (e.g., pentaerythritol tetrakis (3-(3,5-di-tert-butyl-4-hydroxyphenyl) propionate)) for assisting in controlling oxidation, cure rate or both.

Other additives which may optionally be included in the first or second components of the invention and include, for example, fillers, surfactants, acid scavengers, water scavengers, cell regulators, catalysts pigments, dyes, UV stabilizers, plasticizers, fungistatic or bacteriostatic substances, and fillers.

An accelerator for the blowing agents may also be provided in the activatable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles.

One exemplary formulation for an activatable material according to the present invention is shown below in Table A:

| Ingredients in pads by weight | | Supplier |
|---|---|---|
| Part A (first component) | | |
| Jeffol SG - 360 (Polyol) | 100 | Huntsman |
| DC-193 (surfactant) | 3.2 | Air Products |
| Dabco 33-LV (Tertiary amine catalyst) | 3.6 | Air Products |
| Dabco T-12 (Dibutyl Tin Catalyst) | 0.2 | Air Products |
| Water | 5.5 | |
| Colorant | 4 | |
| Total | 116.5 | |
| Part B (second component) | | |
| Mondur MR (MDI type of isocyanate) | 174.9 | Bayer Corp. |

As suggested, the assembly of the present invention will typically include a first compartment, a second compartment and a mixing initiator. The first and second compartments will typically be at least partially or substantially encased by a first and second housing respectively. Moreover, the first and second compartments will each typically be at least partially or substantially fully filled with the polymeric material, the curing agent, and for foaming materials, the blowing agent. Either the first or second compartments may also contain any of the other potential ingredients or additives discussed above.

The first and second housings will typically be attached to each other and will separate the first component from the second component. The first and second housing may integrally formed of the same material or separate materials. For example, the first and second housings may be formed by a single container that includes a wall disposed within the container for separating the first component from the second component. As another example the first housing may comprise a first container containing the first component and configured for placement or location within a second container containing the second component wherein the second container acts as the second housing. Of course, the first component could be located within either the first or second housing while the second component may be located in the other of the first or second housing.

The mixing initiator can include one member or may be comprised of two or more members. Typically, such one or more members are movable by a machine, an individual or the like for initiating the mixing of the first component with the second component thereby forming and activating the activatable material. It is also typical for the mixing initiator to be operably attached or connected to the housings for initiating the mixing. As one example, the mixing initiator could comprise one or more members adjacent or attached to (e.g., integrally formed with) a wall separating the first component from the second component and, upon movement of the one or more movable members, the divider wall may be moved or failed (e.g., displaced or fractured) for allowing mixing. Alternatively, the mixing initiator could comprise one or more members configured to operate as a plunger for moving the first component or the second component from within one housing into the other housing.

Generally, the housings and the mixing initiator can be formed of any suitable materials and such materials could include metals, fabrics, fibrous materials or others. Typically, polymeric materials (e.g. plastics) are preferable.

Referring to FIGS. 1-6, there is illustrated one exemplary embodiment of an assembly 10 according to the present invention. The assembly 10 includes a first housing 12, which substantially surrounds and/or defines a first compartment 14, a second housing 18, which substantially surrounds and/or defines a second compartment 20 and a mixing initiator 24, which is comprised of a first movable member 26 and a second movable member 28.

The first housing 12 is at least partially provided as an annular plastic wall 32 that substantially surrounds and/or encloses the first compartment 14. In the particular embodiment shown, the annular wall 32 is preferably non-circular (e.g., square, rectangular or, as shown, oval) in cross-section, although in other embodiments, it may be circular. The wall 32 is also shown to include one or more (e.g., one, two, three, four or more) weaker sections 36, which are illustrated as sections that are substantially thinner (e.g., having a thickness that is only 90%, 70%, 50% or less) than most (e.g., greater than 50%, 70% or more) of the rest of the wall 36. Of course, weaker sections could also be created by other techniques such as by forming the sections of a different material and/or providing such section with a particular shape. In the particular embodiment illustrated, the weakened sections 36 are elongated and extend substantially from a first end of the housing 12, the wall 32 or both to a second end thereof.

An annular cap portion 40 is integrally formed with the first housing 12 and provides an end wall of the housing 12. The cap portion 40 also includes an annular protrusion 42 that defines a cavity 44.

The second housing 18 is illustrated as being comprised of a mixing enclosure 50 (shown as a cup) and a covering 52 (shown as a bag) that cooperatively form an annular wall 54 that substantially surrounds and/or encloses the second compartment 56 as well as the first housing 12 and the first compartment 14. The mixing cup 50 and bag 52 of the second housing 18 also cooperatively define an end wall 60, at an end of the annular wall 54. It should be noted that the term annular as it is used to refer to the walls of the housing or other portions of the present invention is merely intended to mean that at least a portion of the wall or other component extends substantially entirely about a space or other material. Thus the cross section do of the annular walls could trace out a square, a rectangle, a circle, an oval or otherwise.

The mixing cup 50 includes one or more (e.g., one, two, three, four or more) openings 62 and the bag 52 surround the mixing cup 50 such that the openings 60, 62 are substantially limited or restricted from fluid communication with an external environment 66 surround the bag 52, the cup 50, the compartment 56, the housing 54 or any combination thereof.

The first member 26 of the mixing initiator 24 is shown as an elongated member with a head 70 at one end. The second member 28 of the mixing initiator 26 is shown a mixer or mixing cap having outwardly extending fins 72.

Formation

Formation of the housings and mixing initiator of the present invention may be quite variable depending upon the design of the various components of the assembly. Generally, the first housing and the second housing will typically be connected to each other by integral formation of the housings together or by formation of the housings and subsequent attachment of the housings together. The mixing initiator with then typically be operably attached to the first housing, the second housing or both either directly or indirectly. It should also be understood that the various formation steps for forming the assembly can be done in a variety of consecutive steps or may include simultaneous steps and these steps may be carried out in any desired order.

For the assembly 10 of FIGS. 1-6, the mixing initiator 24 is attached to the first housing 12 by attaching (e.g., interference or friction fitting) the mixing cap 28 to the end of the annular wall 32 such that the cap 28 acts as an end wall of the first housing 12. Upon attachment, a portion 76 of the mixing cap 28 including the fins 72 is located within the first compartment 14. It may be desirable to have a degree of sealing between the mixing cap 28 and the first housing 12 by forming at least portions of the components 12 or 28 of sealing materials such as elastomers or by using a separate seal or gasket such as the one show at 82.

The elongated member 26 of the mixing initiator 24 is extended into the cavity 44 and into and/or through an opening 74 (e.g., a through-hole) in the cap 40 such that a distal end 80 of the member 26 is adjacent the mixing cap 28 and the head 70 is at least partially located in the cavity 44 of the cap 40. As shown, a seal 82 such as an O-ring may be employed to seal between the elongated member 26 and the cap 40 at the opening 74 of the cap 40.

The cap 40 of the first housing 12 is also attached to the second housing 18. In particular, an end of the mixing cup 50 is attached (e.g., interference or friction fit) to the cap 40 with fasteners, adhesives, natural friction or otherwise. The bag 52 is attached (e.g., friction or interference fit) to the mixing cup 50 with fasteners, adhesives, natural friction or otherwise.

Operation

Generally, the assembly of the present invention may be employed to form and activate activatable material to provide an activated material within or adjacent a structure of an article of manufacture. Advantageously, the assembly can be employed independently of any additional equipment attached thereto.

Preferably, the activatable material is configured to cure and/or adhere to one or more walls and/or surfaces of the structure and even more preferably configured to foam, expand, cure and adhere to the one or more walls or surfaces. The activatable material will typically be formed and activated by mixing the first component, which is at least initially within one compartment of the assembly with the second component, which is at least initially within a second compartment of the assembly. It should be understood that formation and activation of the activatable material can occur prior to location of the housings or compartments adjacent or within a structure, but preferably such formation and activation occurs simultaneously with and/or after location of the housing or compartments adjacent the structure. In one preferred embodiment, the activatable material is formed and activated within a cavity of a structure.

Figure 6:
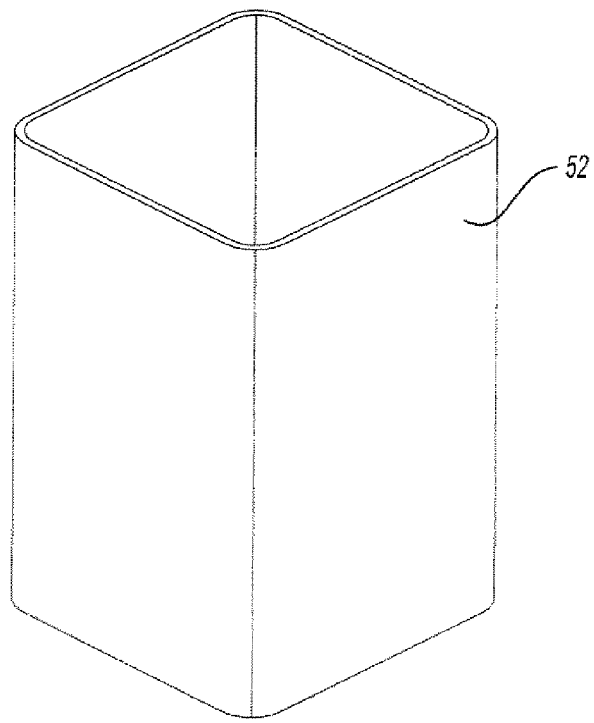

For exemplary purposes, the assembly 10 of FIGS. 1-6 is shown as being applied to a structure 90 (e.g., a pillar) of an automotive vehicle in FIGS. 6A-6B, however, it should be understood that the steps used to apply activatable material to the particular structure shown can also be used to apply activatable material to any other structure of any other article of manufacture as desired. Other structures of vehicles include without limitation, frame members, frame rails, headers, seat cross-bars, body components or the like.

As illustrated in FIGS. 6A-6C, the structure 90 includes an opening 92 (e.g., a through-hole) providing access to an internal cavity 94 of the structure 90. A portion of the assembly 10 including at least a portion or substantially the entireties of the first and second housings 12, 18 and or the first and second compartments 14, 20 extended into and/or are located either automatically, semi-automatically, manually or the like through the opening 92 and adjacent wall or surfaces of the structure (e.g., within the cavity 94).

The mixing initiator 24 initiates mixing of a first component 100 and second component 102 with each other. Such initiation typically involves movement (e.g., rotation or actuation) of one or members of the initiator 24 causing failure (e.g., melting, rupture, movement, combinations thereof or the like) of at least a portion of one or both of the housings 12, 18. As shown, the first component 100 and the second component 102 may be located within either of the first or second compartments 14, 20.

In the particular embodiment illustrated, the elongated member 26 is further extended into the first compartment 14 such that the head 70 of the member 26 is more fully located with the cavity 44 of the cap 40 and such that the end 80 of the elongated member 26 extends into a cavity 110 of the mixing cap 28. Further extension of the elongated member 26 into the compartment can be done manually, semi-automatically or manually. In a preferred embodiment, an individual either pushes the head 70 of the member 26 or locates a bit of a tool such as a drill within a cavity 112 in the head 70 of the member 26 thereby pushing the member 26.

For mixing, the elongated member 26 is rotated (e.g., by the tool and tool bit that interference fits into the geometric cavity 112) thereby rotating the mixing cap 28. In the embodiment shown, the end 80 of the elongated member 26 includes protrusions, which are interferingly received in the cavity 110 of the mixing cap 28 such that rotation of the elongated member 26 can also rotate the mixing cap 28. Such rotation fails (e.g., fractures) the wall 32 of the housing 12 preferably at the weakened portions 36 thereby causing the intermixing of the first component with the second component. As suggested earlier the first component 100 is in one of the first or second compartments while the second component 102 is in the other and failure of the wall 32 allows for flow of the components 100, 102 between the compartments.

Typically, the elongated member 26 is rotated by the tool (e.g., the drill) although such rotation could be accomplished manually or otherwise. Advantageously, the opening 92 of the structure 90 and the outer periphery of the second housing 18, particularly the mixing cup 50, are non-circular (e.g., oval, rectangular or otherwise) and/or nonsymmetrical for preventing any substantial rotation of the housing 18 relative to the structure 90. Moreover, the mixing cap 28 and wall 32 of the first housing 12 are non-circular (e.g., oval, rectangular or otherwise) and/or non-symmetrical such that, upon rotation of the cap 28 relative to the wall 32, the wall 32 of the housing 12 is strained for failing fracturing the wall 32 and allowing mixing. Advantageously, the fins 72 of the mixing cap 28 are rotated along with the cap 28 for inducing greater mixing.

It should be noted that the fins could be angled, twisted or otherwise shaped for inducing greater mixing and the elongated member could include fins for additionally inducing greater mixing. Additionally, the first housing could be redesigned as a bag or such that a bottom portion of the housing would break away for inducing mixing.

Upon mixing, the activatable material is formed and activated within the cavity to expand, foam, cure and adhere to the walls defining the cavity 94 of the structure 90 thereby forming an activated material or foam. During such activation, the activating material will typically escape the second housing or expand or stretch the second housing outwardly, although not required. As an example, the activation of the material may produce heat due to an exothermic reaction of the first component with the second component. In turn, such heat may fail (e.g., soften and or melt) a portion of the second housing, particularly the bag of the housing, allowing the activated material to expand or stretch the bag. Alternatively or additionally foaming or expansion of the activatable material could create pressure to fail (e.g., rupture) the portion of the housing.

Preferably for a foaming activatable material, although not required, the activatable material foams and expands sufficiently to substantially fill a cross-section spanning the cavity. In this manner, the activated material can limit or prevent the passage of sound and or other materials through the cavity. Thus, the activatable material can be used for baffling and, depending upon the activatable material used, may additionally or alternatively be used for reinforcement. When used primarily for baffling, the activatable material will typically expand to a volume that is at least 300%, more typically at least 600% and even more typically at least 1000% of the volume of its components prior to mixing and/or expansion of the ingredients. When used primarily for reinforcement, the activatable material will typically expand to a volume that is at least 101%, but less than 550%, more typically less than 300% of the volume of its ingredients prior to mixing and/or expansion of the components.

As discussed, the first or second housings of the assembly may have a variety of configurations. As one preferred alternative to the second housing 18 of FIGS. 1-6, it is contemplated that such housing may be configure with a single opening (e.g., through-hole) or multiple openings for providing predetermined direction to the expansion of the activatable material (i.e., by allowing the activatable material to expand and flow out of one, two, three or more predetermined through-holes, greater control over the locations into which the material flows can be accomplished). Typically, although not required, the one or more openings will be at least temporarily closed by one or more coverings which substantially prevent flow through the openings until activation of the activatable material. Such coverings, can be section of material such as plastic, elastomer, polymer, fabric, wax, metal (e.g., aluminum) foil or the like that are generally weaker than whatever material the rest of the second housing is formed of such that, upon activation, the activatable material will tend to fail (e.g., rupture or melt) the coverings and flow through the openings. Such coverings could be attached to the rest of the housing with fasteners, adhesives or attached as, for example, a molded in insert. Alternatively, the coverings may be integrally formed of the same material as the rest of the housing, but may be thinner or otherwise have a weakened connection with the rest of the housing.

Figure 17:
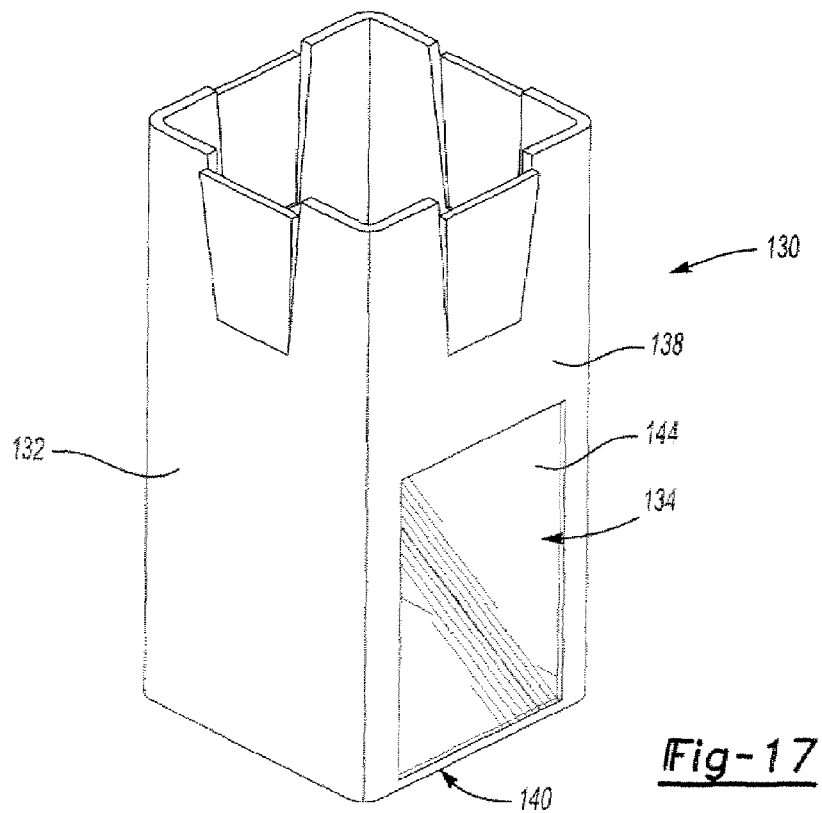
FIG. 17 illustrates at least a portion of a housing suitable for use as an alternative to other housings of the present invention.

As an example, in FIG. 17, a second housing 130 suitable for replacement of the housing 18 of FIGS. 1-6 is illustrated to include a cup or other enclosure 132 with one opening 134 shown as a through-hole extending through one side 138 and, optionally, a portion of a back wall 140 of the enclosure 132. A covering portion 144 has been insert molded into the opening 134 for at least temporarily preventing flow through the opening 134. Upon activation, the activatable material expands and fails that covering 144 to provide flow of the material through the opening 134 into a location adjacent and/or around the opening 134. Of course, the rest of the assembly 10 of FIGS. 1-6 would operate as described above in conjunction with the new housing 130

As an alternative, a plastic bag can provide about the enclosure for providing a covering portion overlaying the opening. Upon activation, the activatable material expands and fails that bag and particularly the covering of the bag to have flow of the material through the opening into a location adjacent and/or around the opening.

For these particular embodiments where the openings are designed to have the activatable material flowing to particular locations, it can be advantageous to have a design that assists in assuring a consistent application of the assembly to the structure. For example, if the second housing were non-symmetrical in a manner that corresponds to a non-symmetry of an opening of the structure, it is possible that the housing will only be capable of insertion into the opening if those non-symmetrical shapes are aligned. Such asymmetry will then help assure that the one or more openings of the housing are located at the same location within the structure upon installation of the assembly to the structure.

Figure 18:
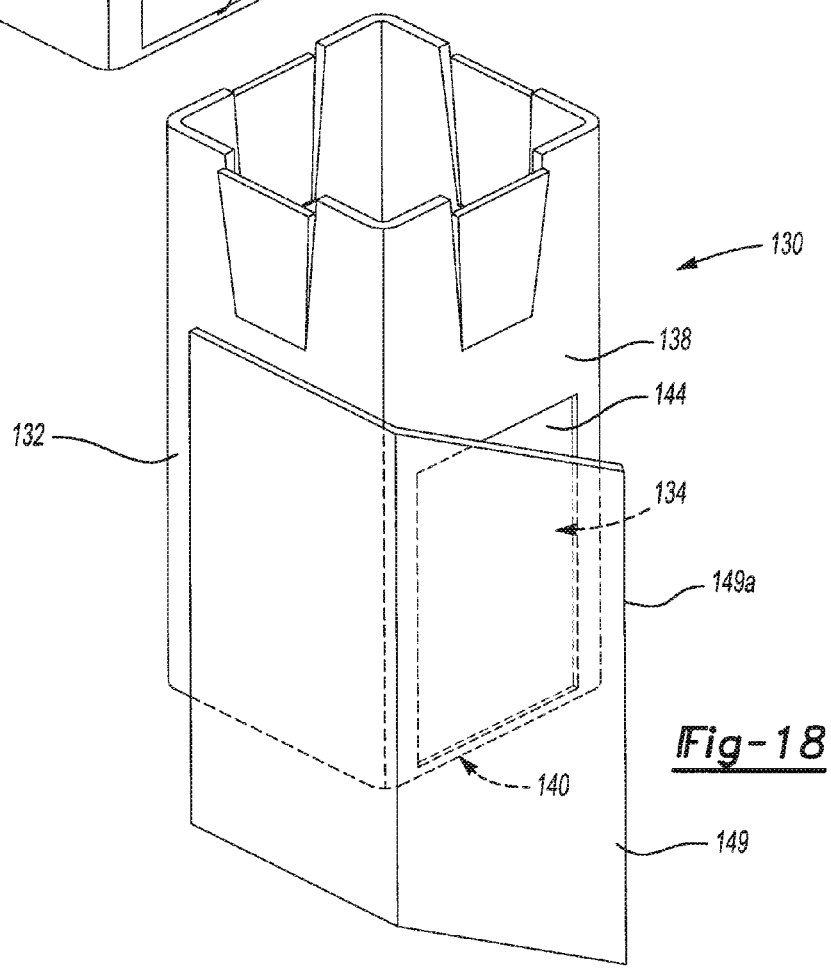
FIG. 18 illustrates at least a portion of another housing suitable for use as an alternative in the present invention.
Figure 19:
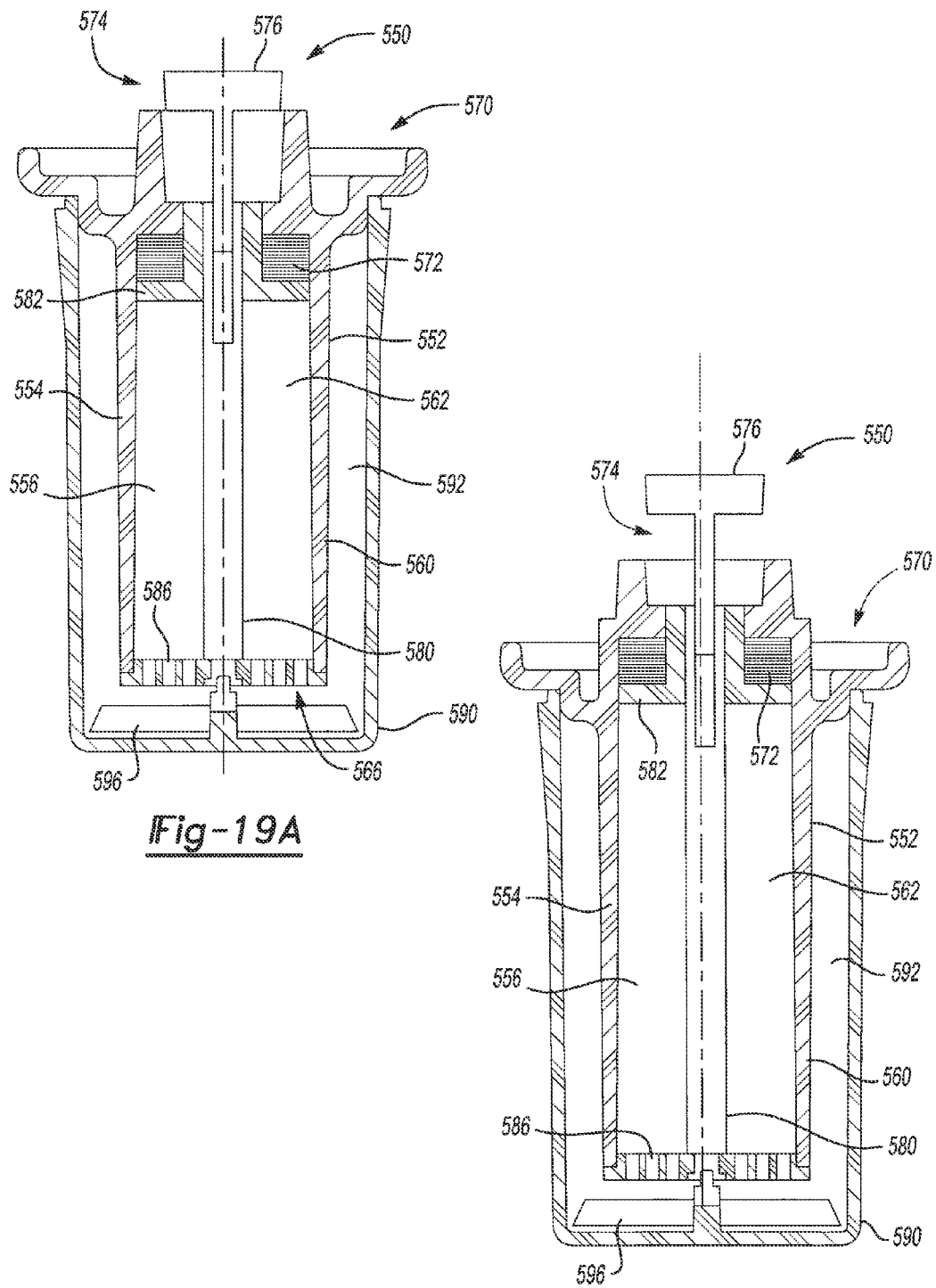

As an additional feature, it is contemplated that the assembly of the a present invention may include one or more guide members for assisting the activatable material in flowing in one or more predetermined directions. In FIG. 18, a guide member 149 has been attached to (e.g., integrally formed with or secured to with adhesive or fasteners) the housing of FIG. 17. As can be seen, the guide member 149 has a guide flap 149A that can be bent down to allow insertion of the housing into a cavity of a structure followed by rotation back away from the housing after insertion. The flap 149A can then guide activatable material in directions away from the flap 149A as the material exits the opening of the housing. Of course, alternative guide members could be provided as well and may have a variety of configurations.

Figure 17A:
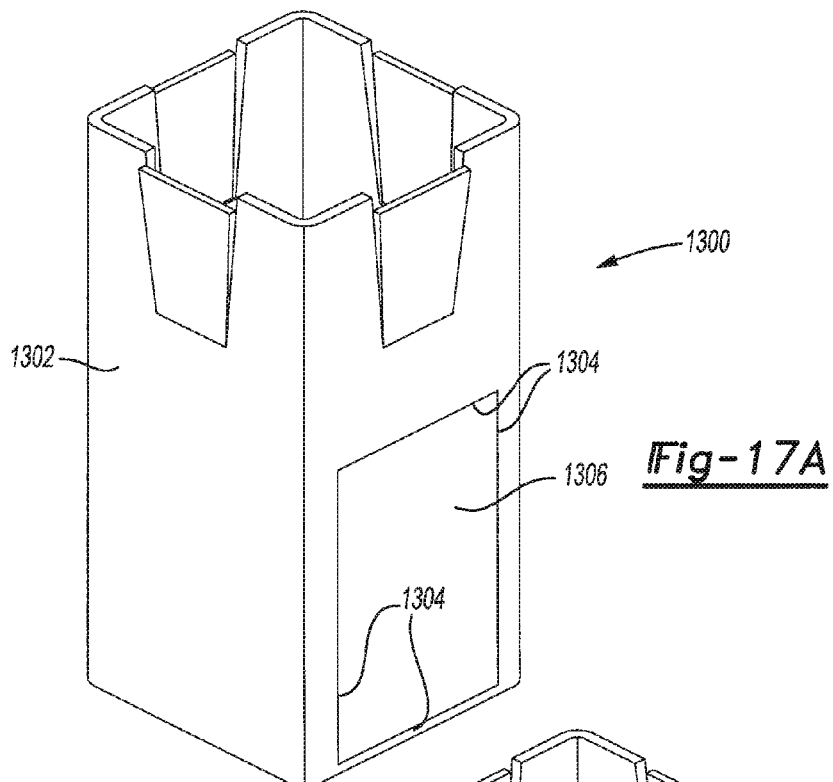
FIG. 17A illustrate at least a portion of another housing suitable for use as an alternative to other housings of the present invention.

As a preferred example, shown in FIG. 17A, another second housing 1300 suitable for replacement of the housing 18 of FIGS. 1-6 is illustrated to include a cup or other enclosure 1302, which may be formed entirely of singular plastic material that can be the same or different than the first housing. The housing 1300 is illustrate to include weakened portions 1304 shown as scored lines in the material of the housing 1300. These weakened portions 1304 define a portion or panel 1306 of the housing 1300 and the weakened portions 1304 can assist the housing in failing at those portions 1304 for allowing activatable material, upon activation, to flow out of the housing 1300. For example, the weakened portion 1304 can be designed to allow the panel 1306 to entirely tear away from the rest of the housing 1300. Alternatively, the panel 1306 may be designed to fail at one or more of the weakened portions while one or more of the other weakened portion acts as a hinge such that the panel 1306 acts as a door to allow the activated material to flow through an opening where the panel was. For example, one or more of the weakened portions 1304 can be stronger (e.g., thicker due scoring that is not as deep) than one or more of the other weakened portions 1304 to allow the stronger of the weakened portions to act as the hinge. Such a panel 1306 can also act as a guide member as previously described.

Additional Alternative Embodiments

It shall be understood that the following alternative embodiments include housings and other components and can be formed and operated in a manner similar to those of FIGS. 1-6C. Thus, the description of such housings, components, formation and operation apply to the following embodiments and, in certain instances, for expediency, only differences between the following embodiments and the embodiments of FIGS. 7-16 are fully described.

Generally, the first component of the activatable material may be maintained separate from the second component of the activatable material using a variety of housing configurations as long as the housings allow for introduction and/or mixing of the components once such mixing is initiated by the mixing initiator. As an example, housings may share a wall that separates the components and that wall may include openings that can be selectively opened to allow mixing of components. Individual housings may be located together in one or more containers and the mixing initiator may be able to fail (e.g., rupture or fracture) those containers to cause mixing of components.

Figure 7:
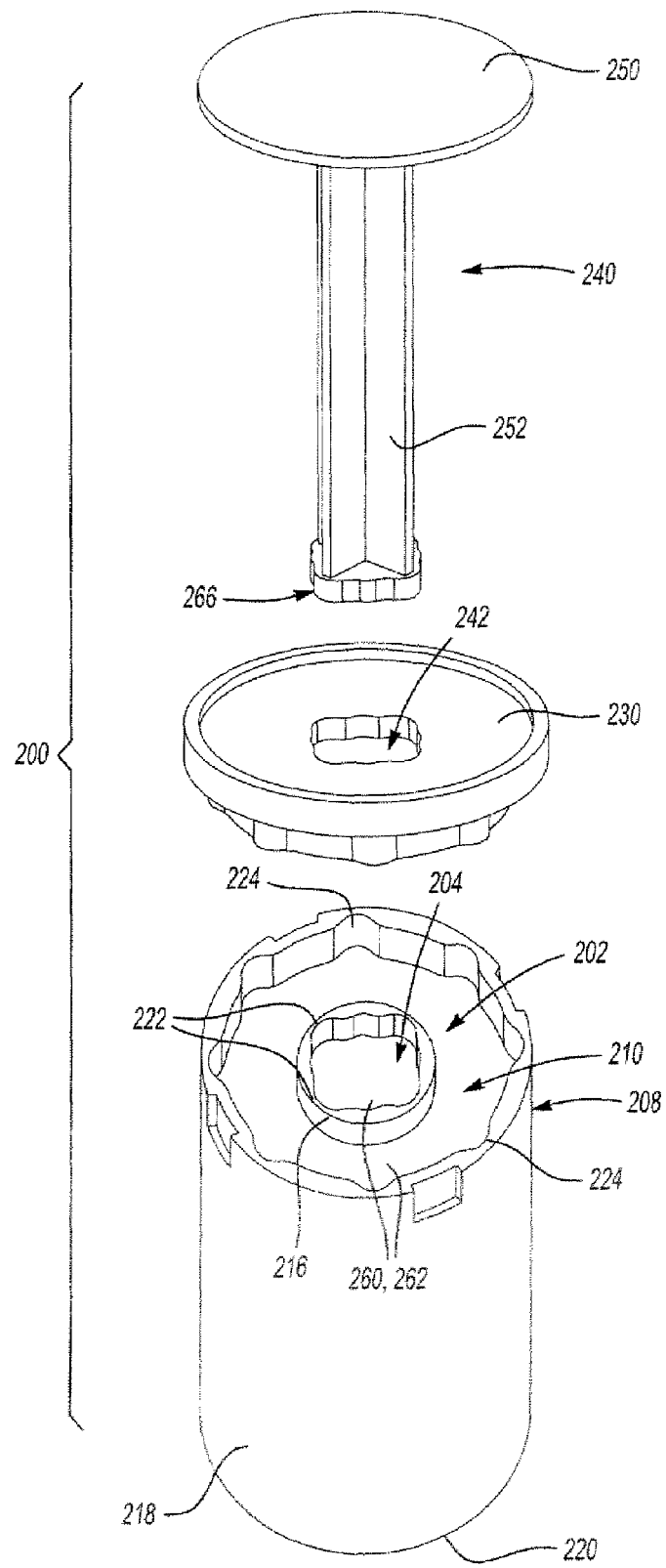
FIG. 7 is a blown up perspective view of an alternative exemplary assembly according to another aspect of the present invention.
Figure 8:
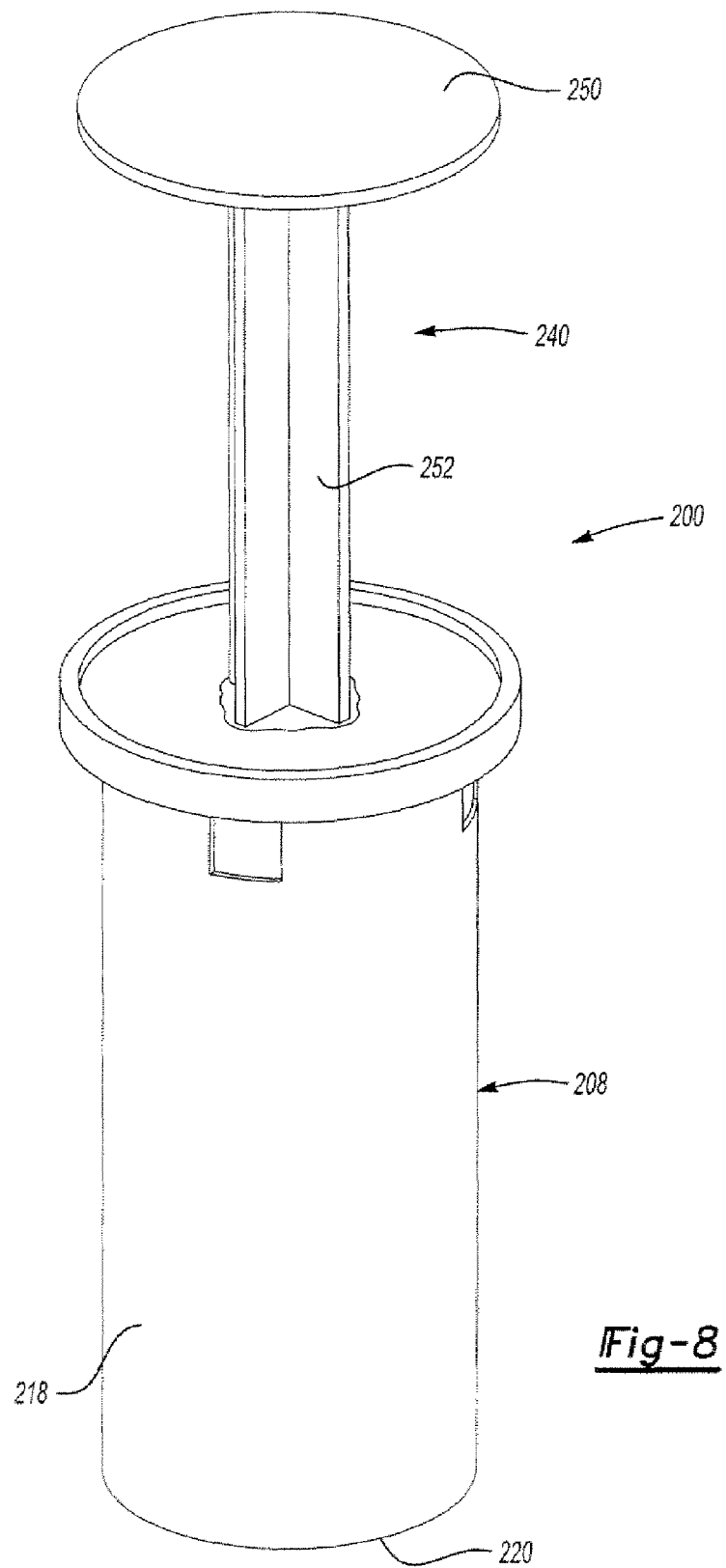
FIG. 8 is a perspective view of the exemplary assembly of FIG. 7 after connection of the components of the assembly together.
Figure 9:
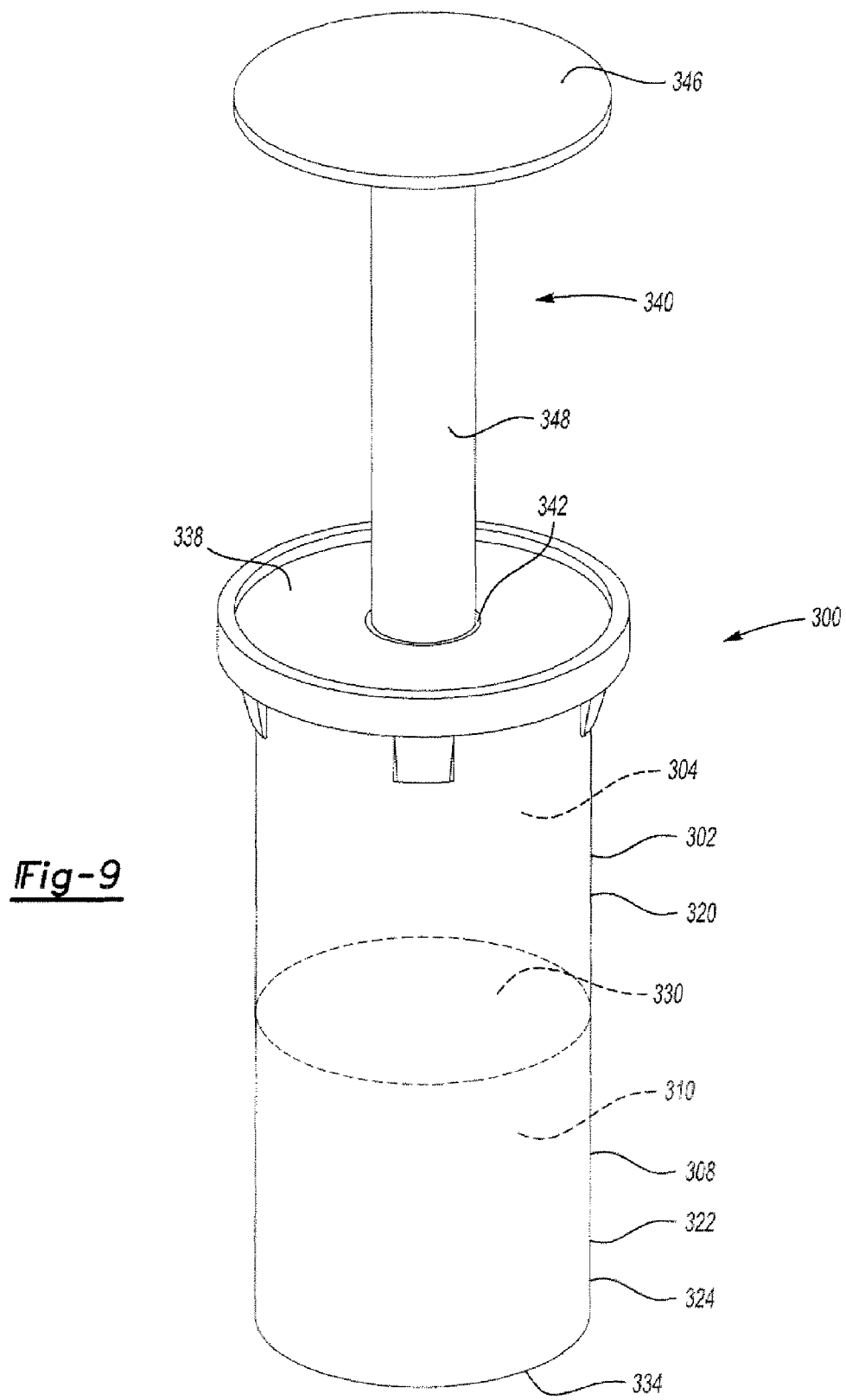
FIG. 9 is a perspective view of another exemplary assembly according to an aspect of the present invention.
Figure 10:
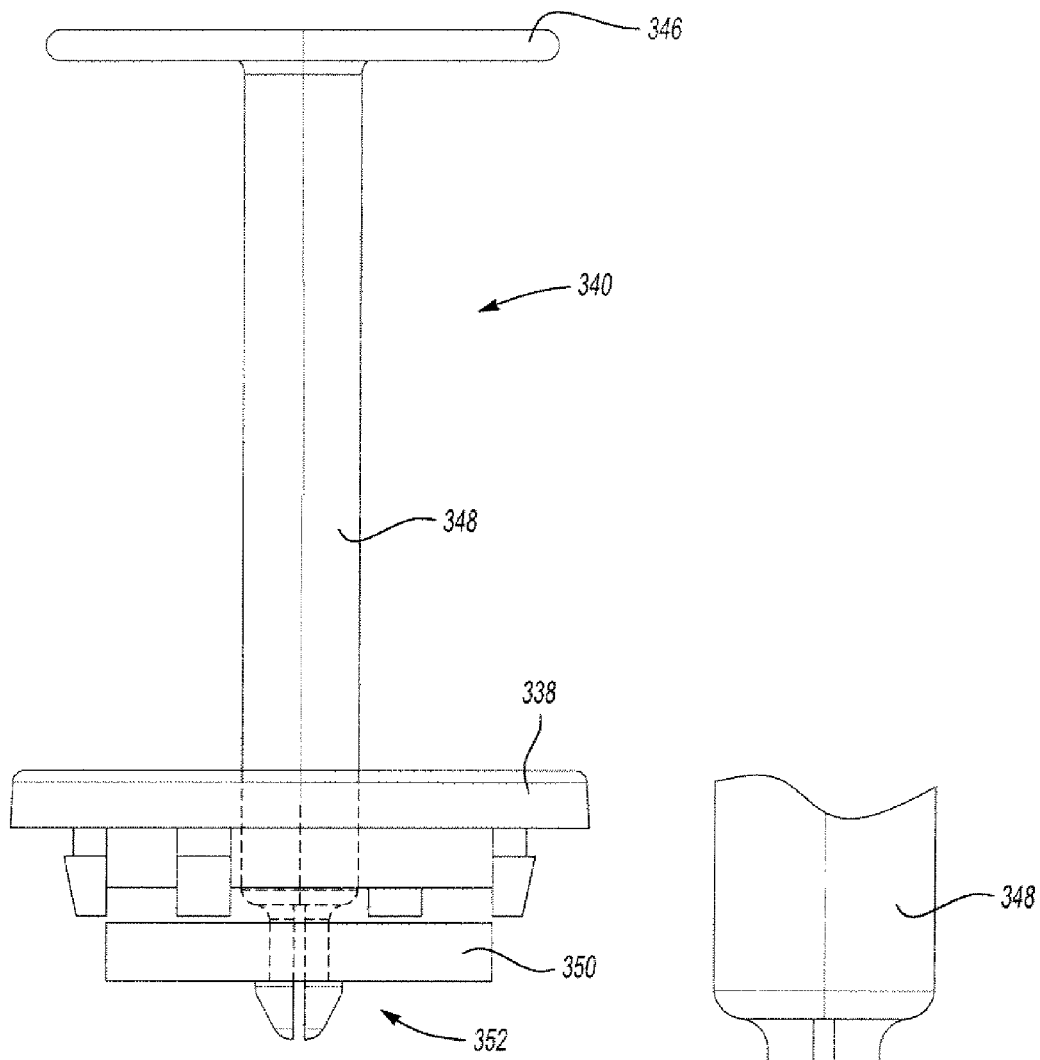
FIGS. 10-12 illustrate components of the exemplary assembly of FIG. 9.
Figure 11:
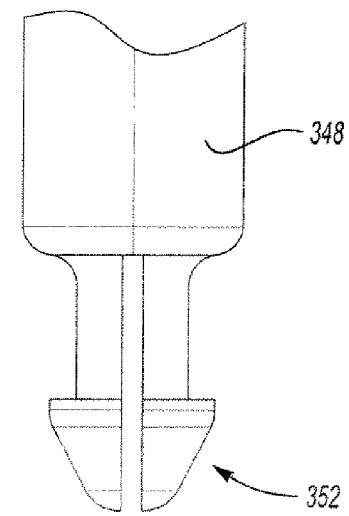
Figure 12:
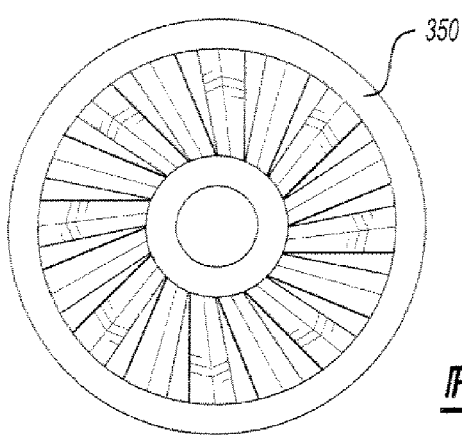

FIGS. 7-12 illustrate alternative walls suitable for fracture by a mixing initiator. In FIGS. 7 and 8, there is illustrated an assembly 200 with a first housing 202 substantially enclosing a first compartment 204 and a second housing 208 enclosing a second compartment 210. In the embodiment shown, the first housing 202 and second housing 208 are integrally formed or molded of the same material (e.g., plastic). Both the first housing 202 and the second housing 208 respectively include annular walls 216, 218 and share one end wall 220. As shown, the annular walls 216, 218 of the first and second housings 202, 208 further include weakened portions 222, 224 similar to those described with respect to the wall 32 of the assembly 10 of FIGS. 1-6.

The assembly 200 and particularly the housings 202, 208 of FIGS. 7 and 8 share a cap 230 for closing a second end of the housings 202, 208. Moreover, a mixing initiator 240 shown as a movable member (e.g., a plunger or actuatable member) is fit in an opening 242 (e.g., a cavity or through-hole) of the cap 230. The movable member 240 includes a cap or head portion 250 and an elongated member or extension 252 extending from the cap portion 250. The first and second housings 202, 208 contain and separate the first and second components 260, 262 of the activatable material and, as discussed, the first and second components can be located within either of the housings 202, 208.

The assembly 200 of FIGS. 7 and 8 can be employed to apply activatable material to a structure in a manner similar to or the same as the assembly 10 of FIGS. 1-6 with the exception that the mixing of the first and second components 260, 262 is accomplished according to a different protocol. For the assembly 200 of FIGS. 7 and 8, the movable member 240, and particularly the extension 252, is moved (e.g., actuated) into the first housing 202 and/or compartment 204 thereby causing failure of the weakened portions 222 of the wall 216 of the first housing 202 because an end or other portion 266 of the movable member 240 is larger than a cross-section of the wall 216 of the housing 202. In turn, the components 260, 262 are mixed and activated to expand (e.g., foam) and cure (e.g., cross-link or thermoset) and the weakened portions 224 of the wall 218 of the second housing 208 fail due to the pressure of the expansion of the activating material.

In FIGS. 9-12, there is illustrated an assembly 300 with a first housing 302 substantially enclosing a first compartment 304 and a second housing 308 enclosing a second compartment 310 such that the first compartment 304 is next to (e.g., side-by-side, one atop the other or a combination thereof) the second compartment 310. In the embodiment shown, the first housing 302 and second housing 308 are integrally formed or molded of the same material (e.g., plastic). Both the first housing 302 and the second housing 304 share portions 320, 322 of a common annular wall 324 and have a common divider wall 330 separating the first compartment 304 from the second compartment 310. The second housing 308 also include an end wall 334 while a cap portion 338 is fitted at an end of the first housing 302.

A mixing initiator 340 shown as a movable member (e.g., a plunger or actuatable member) is fit in an opening 342 (e.g., a cavity or through-hole) of the cap 338. The movable member 340 includes a cap or head portion 346 and an elongate member or extension 348 extending from the cap portion 346. The movable member 340 also includes an annular mixer member 350 at one end 352 and such mixer 350 may be rotatable if desired. The first and second housings 302 contain and separate the first and second components of the activatable material and, as discussed, the first and second components can be located within either of the housings or compartments.

The assembly 300 of FIGS. 9-12 can be employed to apply activatable material to a structure in a manner similar to or the same as the assembly 10 of FIGS. 1-6 with the exception that the mixing of the first and second components is accomplished according to a different protocol. For the assembly 300 of FIGS. 9-12, the movable member 340 is moved (e.g., actuated) into the first housing 302 and/or compartment 304 such that the end 352 of the extension 348 abuts and causes failure of the common wall 330. In turn, the components are mixed and activated to expand (e.g., foam) and cure (e.g., cross-link or thermoset) and the common outer wall 324 of the housings 302, 308 fails due to the pressure of the expansion of the activating material. It should be noted that the common wall 324 could include weakened portions as in other embodiments herein.

Figure 13:
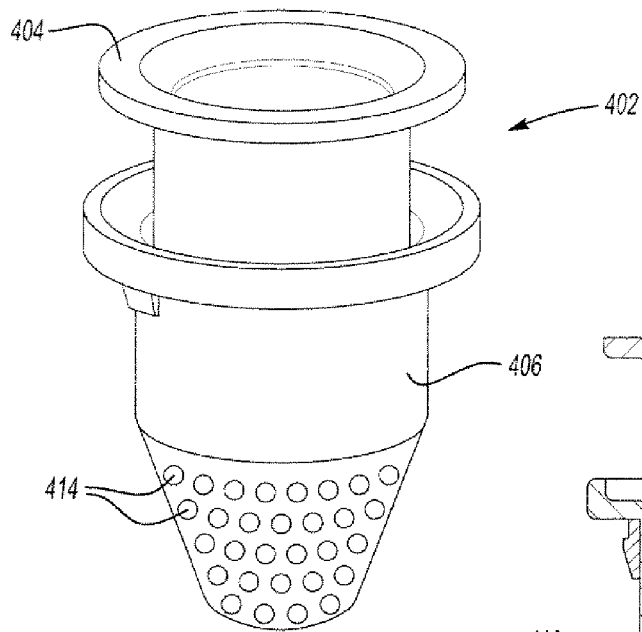
FIG. 13 is a perspective view of another exemplary assembly according to an aspect of the present invention.
Figure 14:
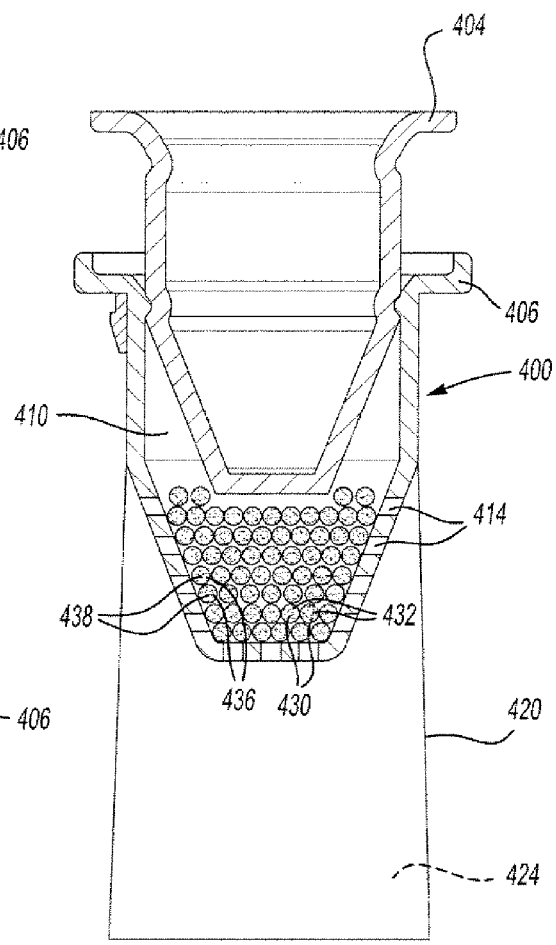
FIGS. 14 and 15 are sectional views of the exemplary assembly of FIG. 13 for illustrating the operation of the assembly.
Figure 15:
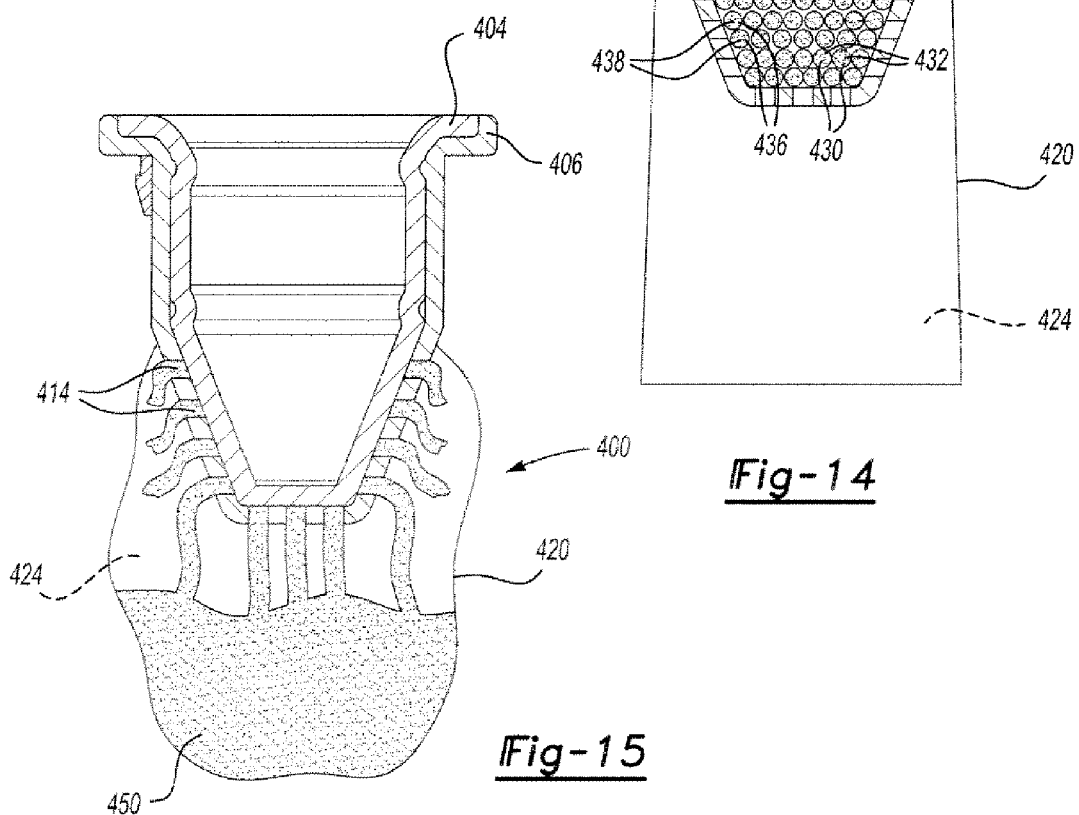

It is additionally contemplated that an assembly of the present invention may be formed to include a plurality (e.g., 2, 3, 4, or more) of first housing and/or a plurality (e.g., 2, 3, 4, or more) of second housings. As an example, FIGS. 13-15 illustrate such an assembly 400. As shown, the assembly 400 includes a mixing initiator 402 shown as a first cup-shaped movable member 404 that is fit into a second cup-shaped member 406. As can be seen, the first member 404 is fit into the second member 406 to substantially enclose an open space 410. Moreover, the second member 406 is provided with one or more and preferably several (e.g., 5, 7, 9 or more) openings 414 (e.g., through-holes).

The assembly 400 is also shown to include a receptacle 420 attached to the first member 404, the second member 406 or both such that an internal space 424 of the receptacle 420 is in fluid communication with the space 410 formed by the members 404, 406 through the openings 414 of the second member 406. The particular receptacle 420 illustrated is a plastic bag.

The assembly 400 also includes at least one but preferably a plurality (e.g., 2, 3, 4, 5 or more) of first housings 430 each defining first compartments 432 and at least one but preferably a plurality (e.g., 2, 3, 4, 5 or more) of second housings 436 each defining second compartments 438. As shown, the first and second housings 430, 436 are provided as encapsulations and are located in the space 410 formed by the members 404, 406 The first and second housings 430, 436 contain and separate the first and second components 432, 438 of the activatable material and, as discussed, the first and second components can be located within either of the housings.

The assembly 400 of FIGS. 13-15 can be employed to apply activatable material to a structure in a manner similar to or the same as the assembly 10 of FIGS. 1-6 with the exception that the mixing of the first and second components is accomplished according to a different protocol. For the assembly 400 of FIGS. 13-15, the movable first member 404 is actuated toward and/or into the second member 406 thereby failing (e.g., rupturing) the first and second housings 430, 436 and causing the first and second components of the activatable material to mix and activate. At the same time and/or thereafter, the activating material 450 flows through the openings 414 into the space 424 of the receptacle 420 and the receptacle 420 may be failed (e.g., melted away by exothermic reaction or ruptured). In turn, the activating material continues to expand (e.g., foam) and cure (e.g., cross-link or thermoset) to adhere to the structure around it.

As an alternative to having both components encapsulated, it is contemplated that either first or second component is encapsulated in their own housings and such housings are located within the other of the components, which is merely located in the space 410 between the members 404, 406 such that the members 404, 406 act as the housing of the other of the components. In such an embodiment, the openings 414 would have to be at least temporarily covered prior to activation of the activatable material such that the other of the components would not flow through those openings 414 prematurely.

Figure 16:
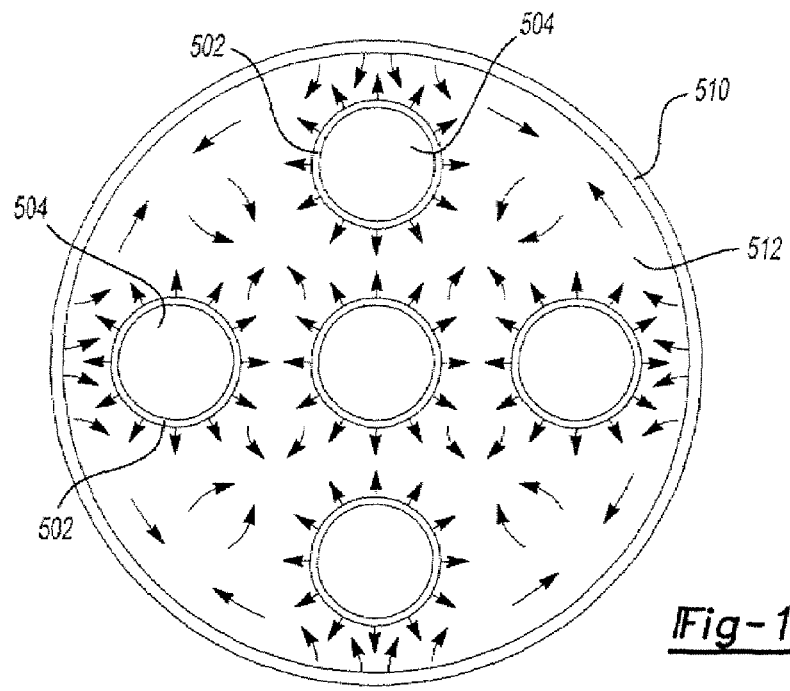
FIG. 16 is a schematic sectional view of yet another exemplary assembly according to an aspect of the present invention.

In yet another embodiment shown in FIG. 16, it is contemplated that multiple first housings 502, provided as encapsulations, will provide multiple first compartments 504 that are internally pressurized with fluid (e.g., air) and/or one of the first component or second component of the activatable material. A second housing 510 will provide a second compartment 512 that contains the other of the first and second component and will also contain the first housings 502. Advantageously, upon application of pressure by a mixing initiator (e.g., a plunger or other movable member) the first housings 502 fail (e.g., rupture) and mixing and activation is provided as in embodiments previously described. Advantageously, the pressurization can increase mixing.

FIGS. 19A-28F illustrate further embodiments of the present invention. The embodiments of FIGS. 19A-28F have many similarities to previously described embodiments and, as such, the skilled artisan will recognize that discussions of previous embodiments apply to the embodiments of FIGS. 19A-28F wherever suitable.

In FIGS. 19A-19B, assemblies 550 are illustrated to have a first receptacle 552 defining a first housing 554 substantially enclosing a first compartment 556 and a second housing 560 substantially enclosing a second compartment 562. Typically, the first receptacle 552 will include a divider wall 566 separating the first and second compartments 556, 562. The assemblies also includes a mixing initiator 570 that includes an energy source shown as a compressed spring 572 and a plunger assembly 574. The plunger assembly 574 typically includes a movable activation member 576 operably connected to a movable shaft member 580 and a movable plunger member 582.

The assemblies 550 can be employed to apply activatable material to a structure in a manner similar to, or the same as previously described. Activation, for the assemblies 550 is typically accomplished by pressing the activation member 576 toward or into the receptacle 552. In turn, the plunger member 582 is released such that the spring 572 can move the plunger member 582 through the receptacle 552 urging the first and second components from the first and second compartments 556, 562 through openings 586 in the receptacle 552 into a secondary receptacle 590. The openings 586, prior to activation, are typically restricted from communication with a compartment 592 of a second receptacle by material, (e.g. films) that are failed (e.g., ruptured) upon activation. Also during activation, the shaft so member 580 and/or the plunger member 582 may be threaded for rotating a mixer member 596, which can assist in more fully intermixing the first and second components of the expandable material. During activation, the expandable material can expand (e.g., foam) and exit the secondary receptacle 590 as described for previous embodiments. It should be noted, that the spring 572 in FIG. 19A is within the secondary receptacle 590 prior to activation, but outside the receptacle in FIG. 19B such that first receptacle in FIG. 19A has greater volume.

Figure 20:
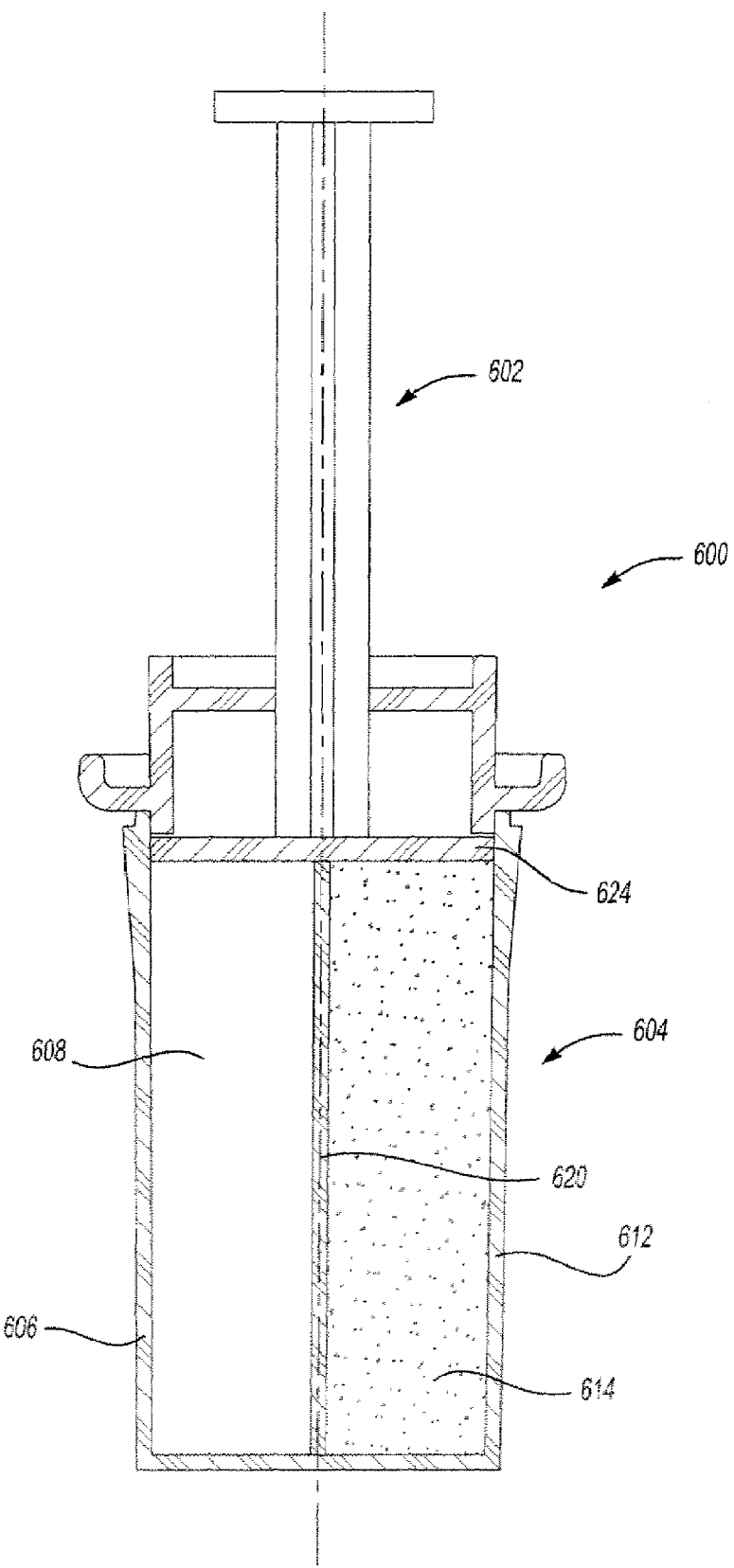

In FIG. 20 there is an assembly 600 having a mixing initiator 602 and a receptacle 604 divided into a first housing 606 substantially enclosing a first compartment 608 and second housing 612 substantially enclosing a second compartment 614. The first and second housings 606, 612 share a divider wall 620 (e.g., a separating film) that separates the first and second compartments 608, 614, which contain the first and second components of the expandable material. For activation, the mixing initiator 602 is actuated in a direction that is within the plane of the divider wall 620 thereby failing the divider wall 620. The mixing initiator 602, in the illustrated embodiment, includes a mixing member 624 having openings (not shown), which could be arranged, for example, like those shown for the mixing member of FIGS. 9-12. The mixing initiator 602 can be actuated into the receptacle 604 to fail (crack, fold, wrinkle, bend or the like) the divider wall 620 and cause intermixing of the components of the expandable material such that the expandable material can be activated to expand and escape the receptacle 604 according to any of the previously describe protocols.

Figure 21A:
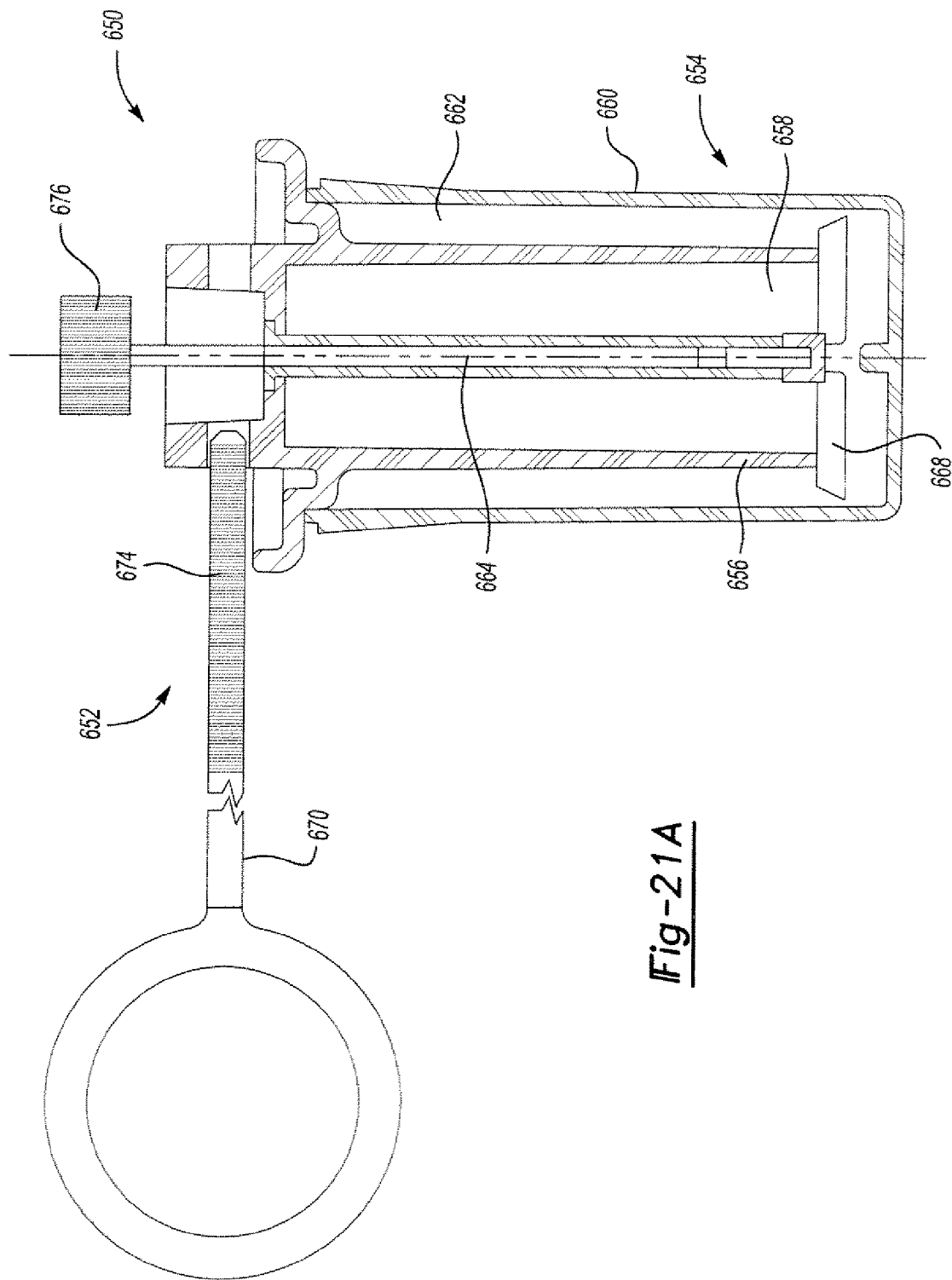
Figure 21B:
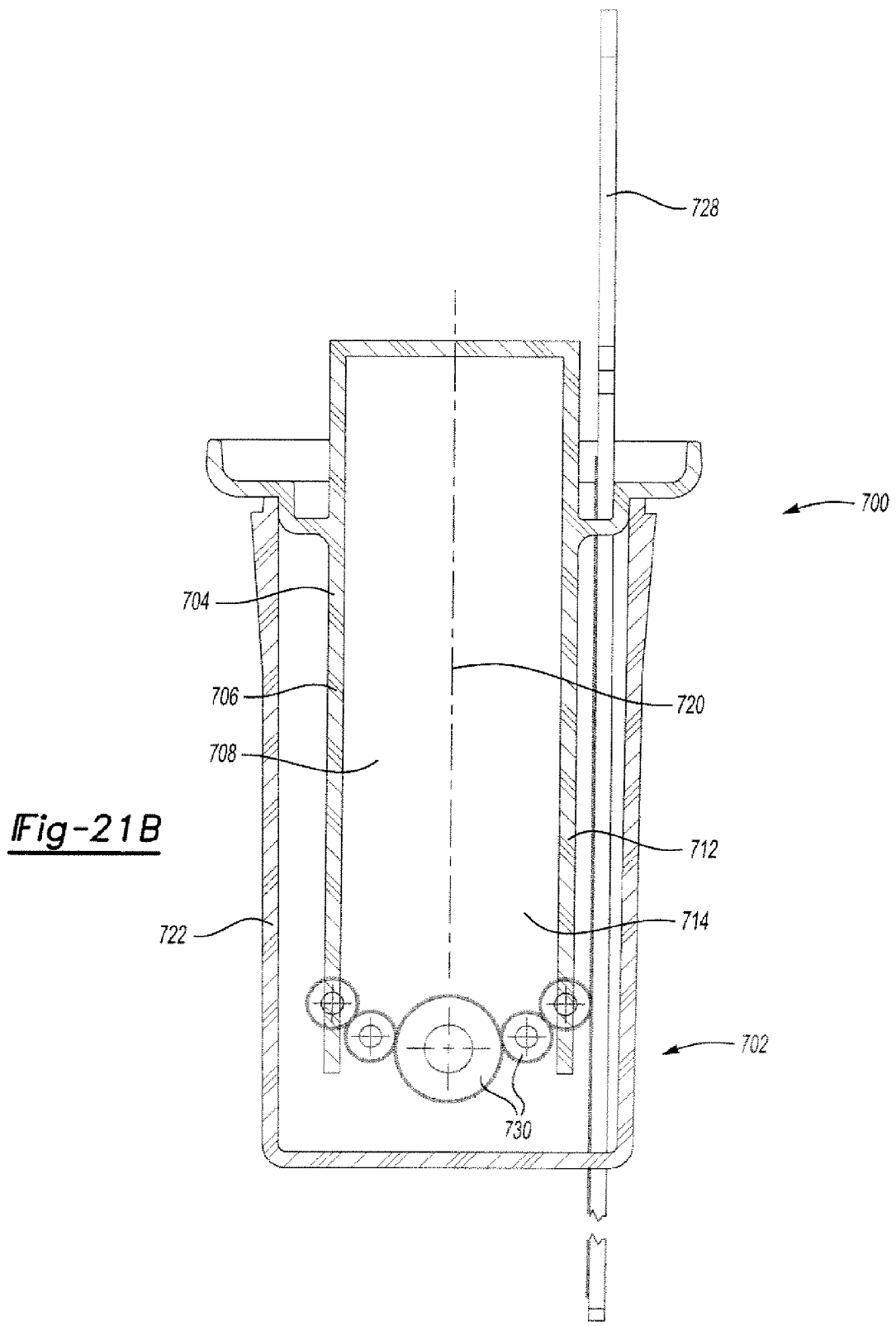
Figure 21C:
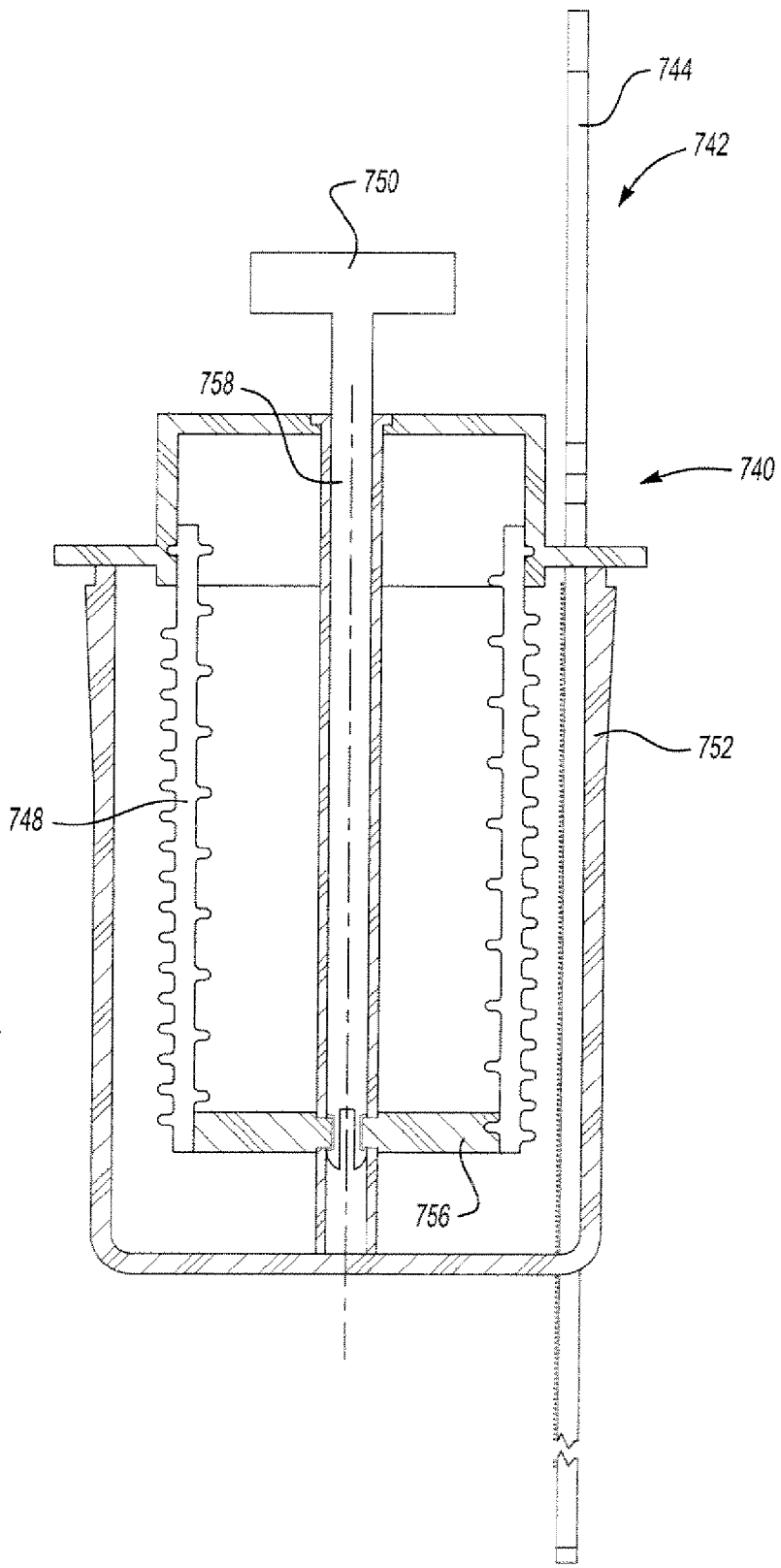

FIGS. 21A-21C illustrate assemblies with pull chord type mixing initiators. In FIG. 21A, there is an assembly 650 having a mixing initiator 652 and a receptacle 654 divided into a first housing 656 substantially enclosing a first compartment 658 and second housing 660 substantially enclosing a second compartment 662. As shown, the second housing 660 also substantially encloses the first housing 656. The mixing initiator 652 includes a rotatable shaft 664, a mixing cap 668 and a pull chord 670. For activation, the shaft 664 of the mixing initiator 652 is actuated further into the first and/or second housings 656, 660 thereby moving the mixing cap 668 away from the first housing 656 and exposing the component of the activatable material in the first housing 656 or compartment 658 to the component in the second housing 660 or compartment 662. Thereafter, the pull chord 670 is pulled partially or fully from the assembly 650 such that protrusions 674 of the chord 670 engage protrusions 676 of the shaft 664 and rotate the shaft 664 and the mixing cap 668. In turn, this causes intermixing of the components in the housings 656, 660 such that the expandable material can be activated to expand and escape the receptacle 654 according to any of the previously describe protocols.

In FIG. 21B, there is an assembly 700 having a mixing initiator 702 and a receptacle 704 divided into a first housing 706 substantially enclosing a first compartment 708 and a second housing 712 substantially enclosing a second compartment 714, the first and second compartments 708, 714 containing first and second components of activatable material separated by a wall 720 or otherwise according to any of the techniques herein. The assembly also includes a secondary receptacle 722. The mixing initiator 702 is generally comprised of a pull chord 728 and multiple mixing gears 730 located between the housings 706, 712 and space within the secondary receptacle 722. To activate the expandable material, the pull chord 728 is pulled such that the gears 730 rotate and move (e.g., pump) the components of the expandable material from the housings 706, 712 into the secondary receptacle 722. In turn, the first and second components are intermixed in the secondary receptacle 722 and, the expandable material is activated to expand and escape the secondary receptacle 722 according to any of the previously describe protocols.

In FIG. 21C, a mixing initiator 740 of an assembly 742 includes a pull chord 744, a first housing 748 and a plunger shaft 750. For activation, the pull chord 744 is pulled partially or fully from a second housing 752 such that the first housing 748 rotates and moves a mixer cap 756 and/or plunger shaft 758 within the first housing 748 causing some mixing of components from the first and second housings 748, 752.

Thereafter, the plunger shaft 758 can be actuated further into the first housing 748 for further mixing the components. Preferably, the cap 756 has openings that are temporarily closed but can be opened (e.g., via rupturing) as with other described embodiments.

In another alternative embodiment shown in FIGS. 22A and 22B, there is an assembly 770 having a mixing initiator 772 and a receptacle 774 divided into a first housing 776 substantially enclosing a first compartment 778 and second housing 780 substantially enclosing a second compartment 782, the first and second compartments 778, 782 containing first and second components of activatable material. The assembly also includes a secondary receptacle 786 containing part of the mixing initiator. As shown, the mixing initiator 772 includes material or members 790 arranged in a housing 792 and the first receptacle 774 and the first and second compartments 778, 782 are located substantially outside the secondary receptacle 786. To activate the expandable material, the receptacle 774 is actuated into the secondary receptacle 786 such that part of the mixing initiator 772 fails (e.g., ruptures) one or more portions 796 of the receptacle 774 such that the first and second components of the expandable material can be moved past the mixing material or members 790. In turn, the first and second components are intermixed and flow through one or more openings in the housing 792 and into a second receptacle 786. Then, the expandable material can be activated to expand and escape the secondary receptacle 786 according to any of the previously describe protocols.

Figure 23A:
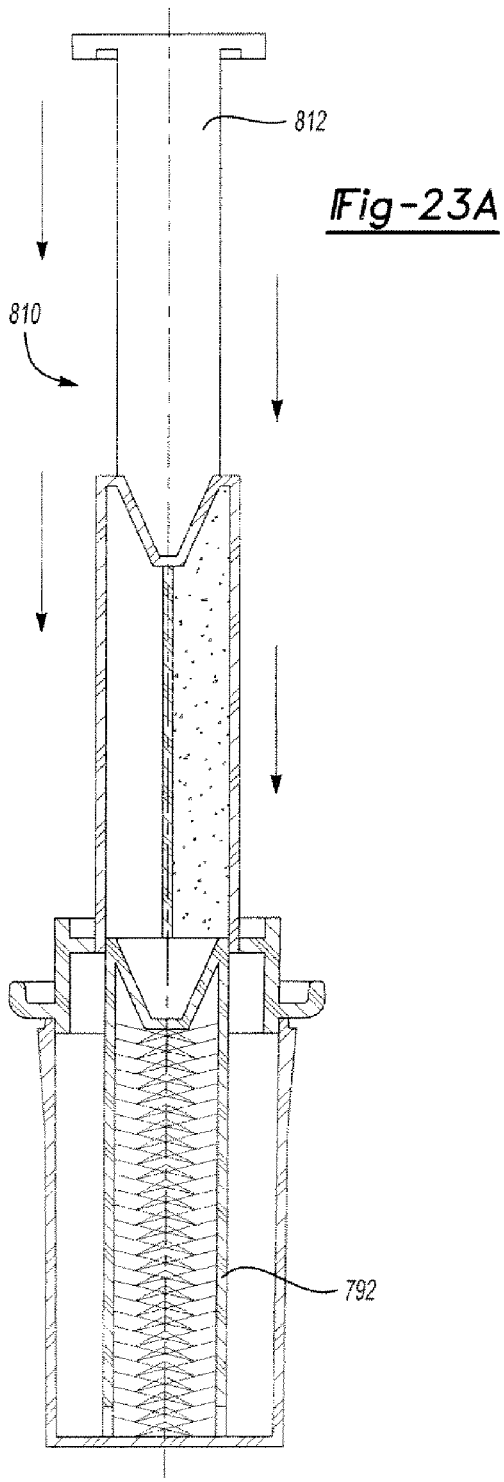
Figure 23B:
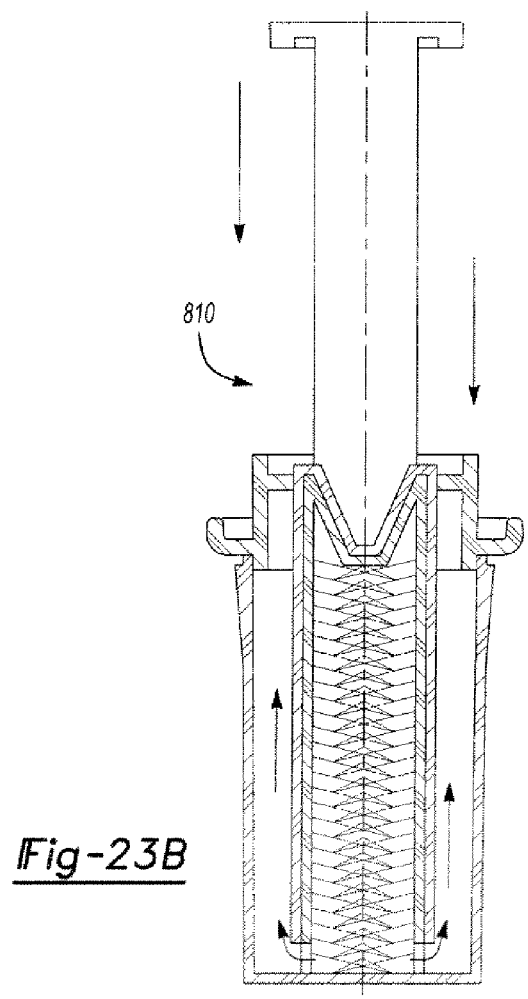

As a modification of the assembly 770 of FIGS. 22A and 22B, an assembly 810 is shown in FIGS. 23A and 23B as having an additional actuation member 812 for the mixing initiator. Advantageously, the member 812 can be actuated into the housing 792 of mixing initiator after intermixing such that any components or expandable material still located within the housing can be purged therefrom.

Figure 24A:
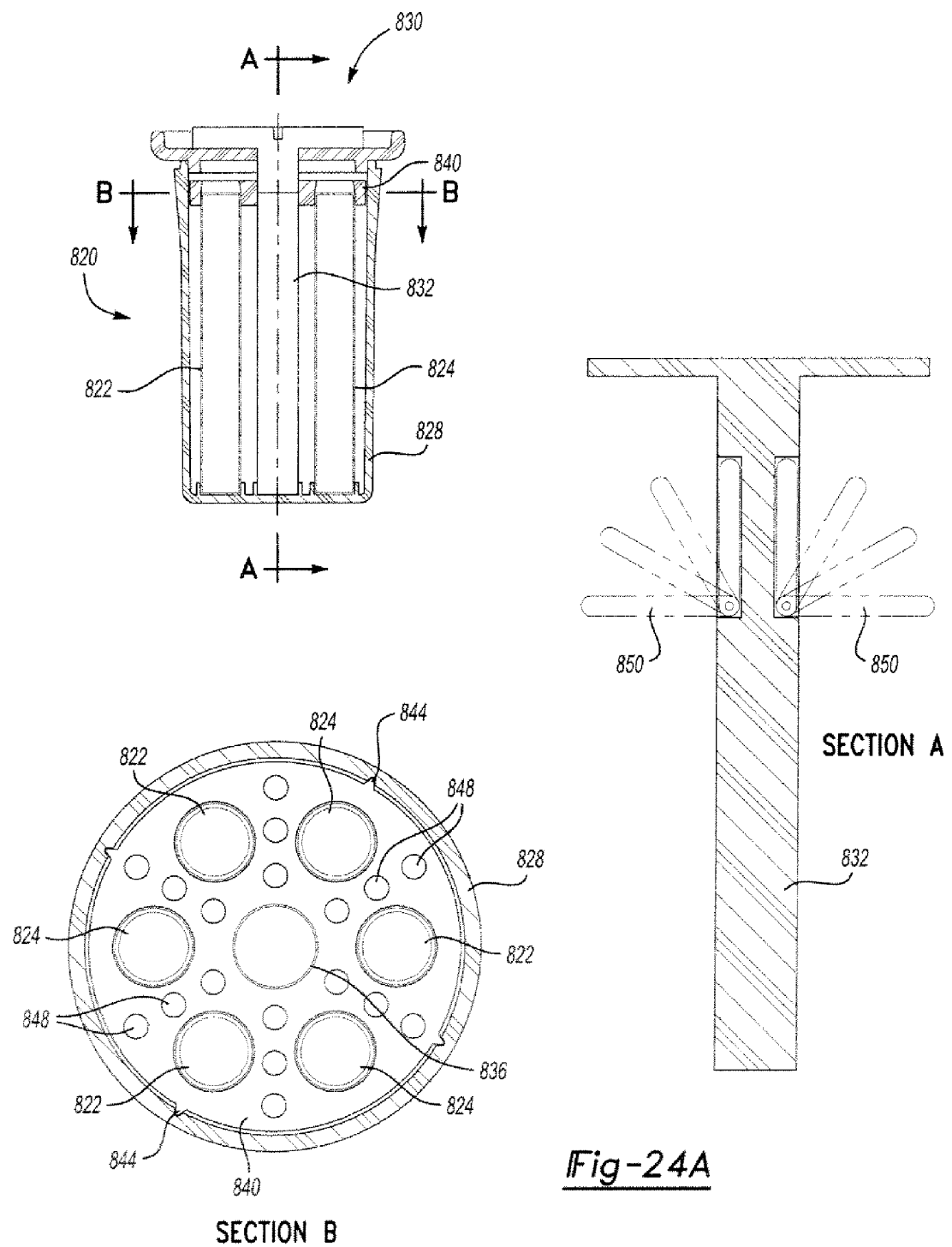
Figure 27A:
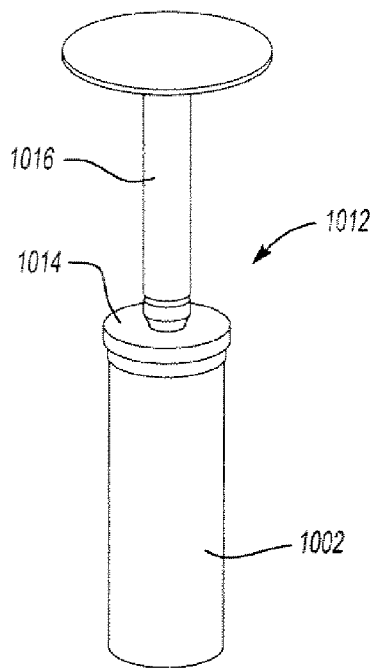
Figure 27B:
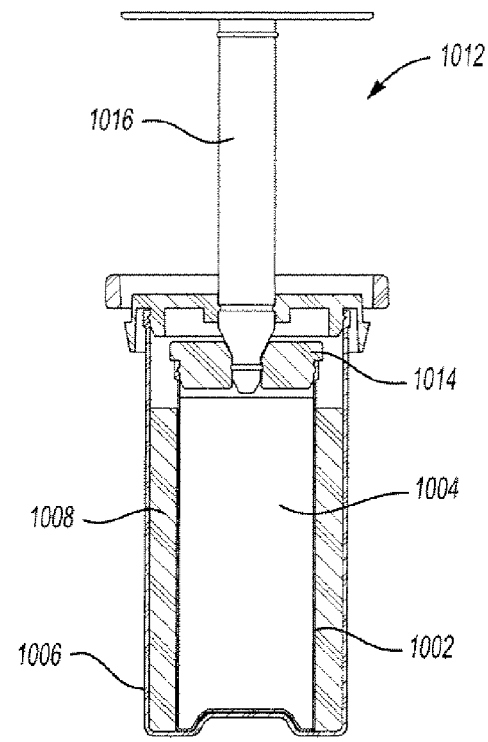
Figure 27C:
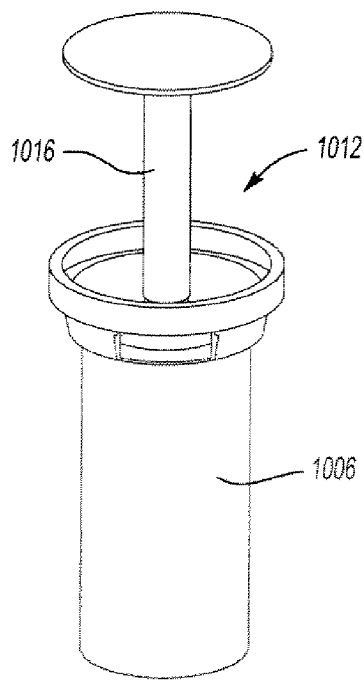
Figure 27D:
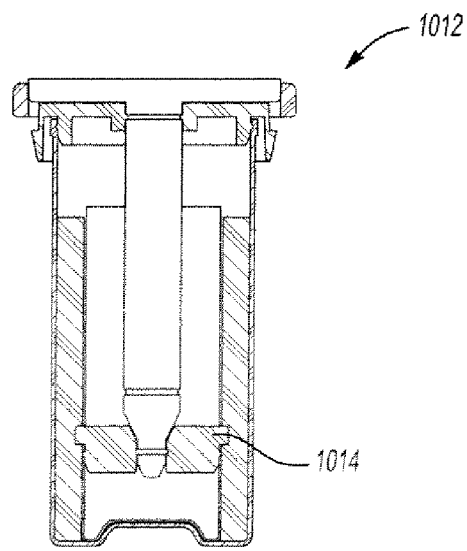

In FIG. 24A, an assembly 820 is illustrated as having multiple first housings 822 containing a first component of the activatable material and multiple second housings 824 containing a second component of the activatable material. The first housings 822 and second housings 824 are preferably polymeric bags of flexible material. The assembly 820 is also shown to include a secondary housing 828 that substantially surround the first and second housings 822, 824. The assembly 820 further includes a mixing initiator 830 that includes threaded shaft member 832 extending into an opening 836 of a mixing member 840 that is also threaded. For activation, the shaft 832 is rotated such that the mixing member 840 is moved within the secondary housing or receptacle 828 and ruptures the first and second housings 822, 824 causing intermixing of the components. As can be seen, the mixing member 840 includes protrusions 844 that extend into cavities of the secondary housing 828 for limiting rotation of the member 840. As the member 840 travels along the shaft 832, the components flow through openings 848 in the member and further intermix. It is also contemplated that mixing arms 850 may be connected (e.g., retractably) to the shaft 832 and may extend outward from the shaft for assisting with mixing of the components. In turn, the expandable material is activated to expand and escape the secondary receptacle 828 according to any of the previously describe protocols.

In FIG. 24B, an assembly 870 is illustrated having first and second housings 872, 874 like those of FIG. 24A. However, such housings 872, 874 may be formed of more rigid materials if desired. As shown, a mixing initiator 878 is comprised of a plunger member 880 with multiple extensions for rupturing the housings 872, 874 upon movement of the member 880 and causing intermixing of components of the activatable or expandable material. It is contemplated that the components may be under pressure in the housings for assisting in mixing upon rupture.

In FIG. 25, an assembly 890 of the present invention is illustrated to have a first housing 892 substantially defining and enclosing a first compartment 894 and a second housing 896 substantially enclosing a second compartment 898 and substantially surrounding the first housing. The assembly 890 includes a mixing initiator 900 that includes an energy source shown as a compressed coil spring 902, a first threaded member 906, a second threaded member 908, a pull chord 920 and a mixer/cap 912.

The assembly 890 can be employed to apply activatable material to a structure in a manner similar to or the same as previously described. As shown, the first component of the activatable material is located in the first compartment 894 and the second component of the activatable material is located in the second compartment 898. Activation, for the assembly 890 is typically accomplished by pulling the pull chord 920 until the chord fails. In turn, the first threaded member 906, which was held in place, at least in part, by the pull chord 920, is released such that the spring 902 places a force upon the first threaded member 906 and moves second threaded member 908 and the cap/mixer 912 away from the rest of the first housing 892. Contemporaneously and/or thereafter, the first threaded member 906 moves along the second threaded shaft member 908 rotating the second threaded member 908 and the cap/mixer 912. The rotation of the cap/mixer 912 preferably aids in mixing and or pumping of the first and second components of the activatable material. During activation, the expandable material can expand (e.g., foam) and exit the second housing 896 as described for previous embodiments.

In FIG. 26, an assembly 940 of the present invention is illustrated to have a first housing 942 substantially defining and enclosing a first compartment 944 and a second housing 948 substantially enclosing a second compartment 952 and substantially surrounding the first housing. The first housing 942 is typically formed of a material such as thin glass or polyethylene, which is designed to shatter or break in multiple locations upon application of a force to the housing 942. The assembly 940 also includes a mixing initiator 956 that includes a plunger member 960. A preferred plunger member 960 can be formed with threading on at least a portion of a shaft 964 of the plunger 960 such that it can be threaded into the first housing by rotation.

The assembly 940 can be employed to apply activatable material to a structure in a manner similar to or the same as previously described. As shown, the first component of the activatable material is located in the first compartment 944 and the second component of the activatable material is located in the second compartment 952. Activation, for the assembly 940 is typically accomplished by extending the plunger member 960 into the first housing 942 such that a force is placed upon the first housing 942 to fail (e.g., shatter) the housing allowing intermixing of the components of the activatable material. Extending of the plunger member 960 may be accomplished by threading the shaft member 964 into a cap portion of the assembly 940 or pushing the member 964. For assisting in mixing of the components of the activatable material, it may be desirable for one or both of the components to be under pressure prior to initiation of activation. It may also be desirable for the mixing initiator 956 to include a mixing member that rotates with the shaft member 964 and, alternatively or additionally, it may be desirable to shake the assembly 940 after initiation of activation and typically prior to insertion in a cavity of an article of manufacture. During activation, the expandable material can expand (e.g., foam) and exit the second housing as described for previous embodiments.

In FIGS. 27A-27D, an assembly 1000 of the present invention is illustrated to have a first housing 1002 substantially defining and enclosing a first compartment 1004 and a second housing 1006 substantially enclosing a second compartment 1008 and substantially surrounding the first housing. The first housing 1002 is typically designed to fail during use. For example, the first housing 1002 could be formed a material that can rupture or the first housing 1002 could include openings that are initially closed but which can be opened by failing a material that initially closes the openings. The assembly 1000 also includes a mixing initiator 1012 that includes a plunger member 1014 and a shaft member 1016 connected to the plunger member 1014.

The assembly 1000 can be employed to apply activatable material to a structure in a manner similar to or the same as previously described. As shown, the first component of the activatable material is located in the first compartment 1004 and the second component of the activatable material is located in the second compartment 1008. Activation, for the assembly 1000 is typically accomplished by pushing the plunger member 1014 into the first housing 1002 via that shaft member 1016 such that a force is placed upon the first housing 1002 to fail the housing 1002 or openings thereof allowing intermixing of the components of the activatable material. In a preferred embodiment, the plunger member 1014 will typically have a size (e.g., diameter) that is larger than a size (e.g., diameter) of the first housing 1002 such that pushing of the plunger member 1014 into the first housing 1002 will cause failure of the first housing 1002. During activation, the expandable material can expand (e.g., foam) and exit the second housing 1006 as described for previous embodiments.

Figure 28A:
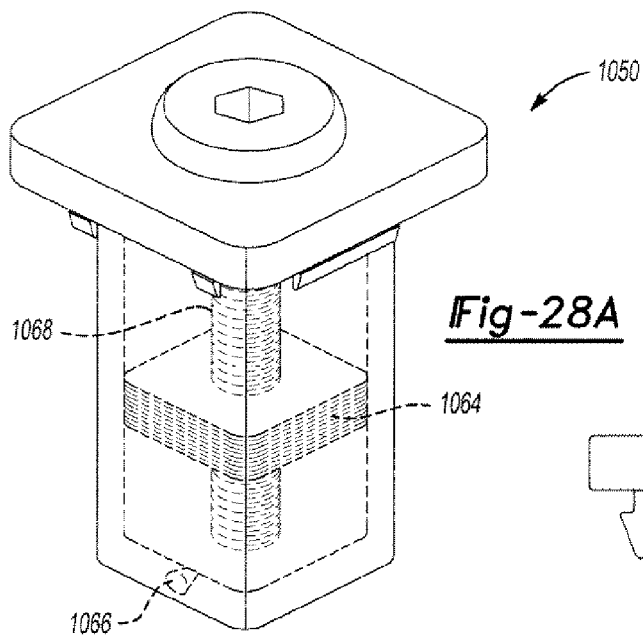
Figure 28B:
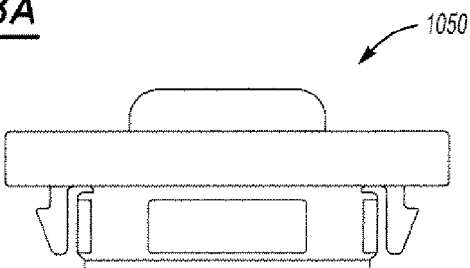
Figure 28C:
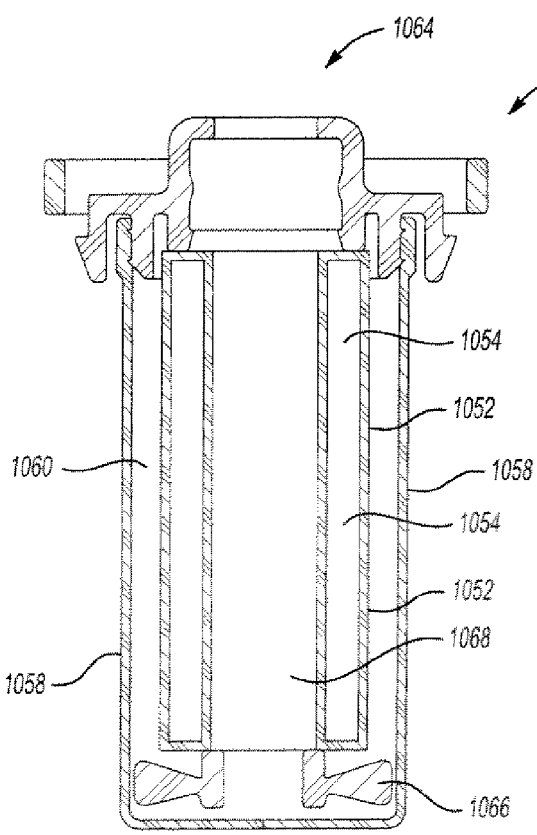

In FIGS. 28A-28C, an assembly 1050 of the present invention is illustrated to have a first housings 1052 substantially defining and enclosing first compartments 1054 and a second housing 1058 substantially enclosing a second compartment 1060 and substantially surrounding the first housings. The first housings 1052 are typically designed to fail during use. As an example the first housings 1052 can be formed of a material such as thin glass or polyethylene, which is designed to shatter or break in multiple locations upon application of a force to the housing 1052. The assembly 1050 also includes a mixing initiator 1064 that includes a mixing member 1066 (preferably threaded) and a shaft member 1068 (preferably threaded) connected to the mixing member 1066.

The assembly 1050 can be employed to apply activatable material to a structure in a manner similar to or the same as previously described. As shown, the first component of the activatable material is located in the first compartments 1054 and the second component of the activatable material is located in the second compartment 1060, although the components may be otherwise arranged in the compartments. Activation, for the assembly 1050 is typically accomplished by rotating the shaft member 1068 such that threading of the shaft member 1068 and the mixing member 1066 cause the mixing member 1066 to move toward the first housings 1052 and compressing the first housings 1052 causing the first housings 1052 to fail (e.g., shatter, crack, break or the like) allowing intermixing of the components of the activatable material. During activation, the expandable material can expand (e.g., foam) and exit the second housing 1058 as described for previous embodiments.

In FIGS. 29A-29C, an assembly 1100 of the present invention is illustrated to have a container 1102 that includes first and second components that can be reacted or activated to form a foam material upon release from the container 1102. The components may be intermixed in the container 1102 or the container could include a first housing substantially defining and enclosing a first compartment and a second housing substantially enclosing a second compartment depending upon the components employed. In a preferred embodiment, the container is a pressurized gas or aerosol type container that can release the components upon movement of a mixing initiator 1104. As shown, the assembly 1100 also includes a receptacle 1108 suitable for receipt of the container 1102.

The assembly 1100 can be employed to apply activatable material to a structure in a manner similar to or the same as previously described. In the particular embodiment, the receptacle 1108 can be placed in a cavity of a structure. Simultaneously or thereafter, the container 1102 can be actuated into the receptacle 1108 such that the mixing initiator 1104 is moved or actuated (e.g., depressed). In turn, the components are released (typically under pressure and as a spray, although not required) from the container 1102 and/or receptacle 1108 and form a foam in the cavity of the structure as described for previous embodiments.

Figure 30:
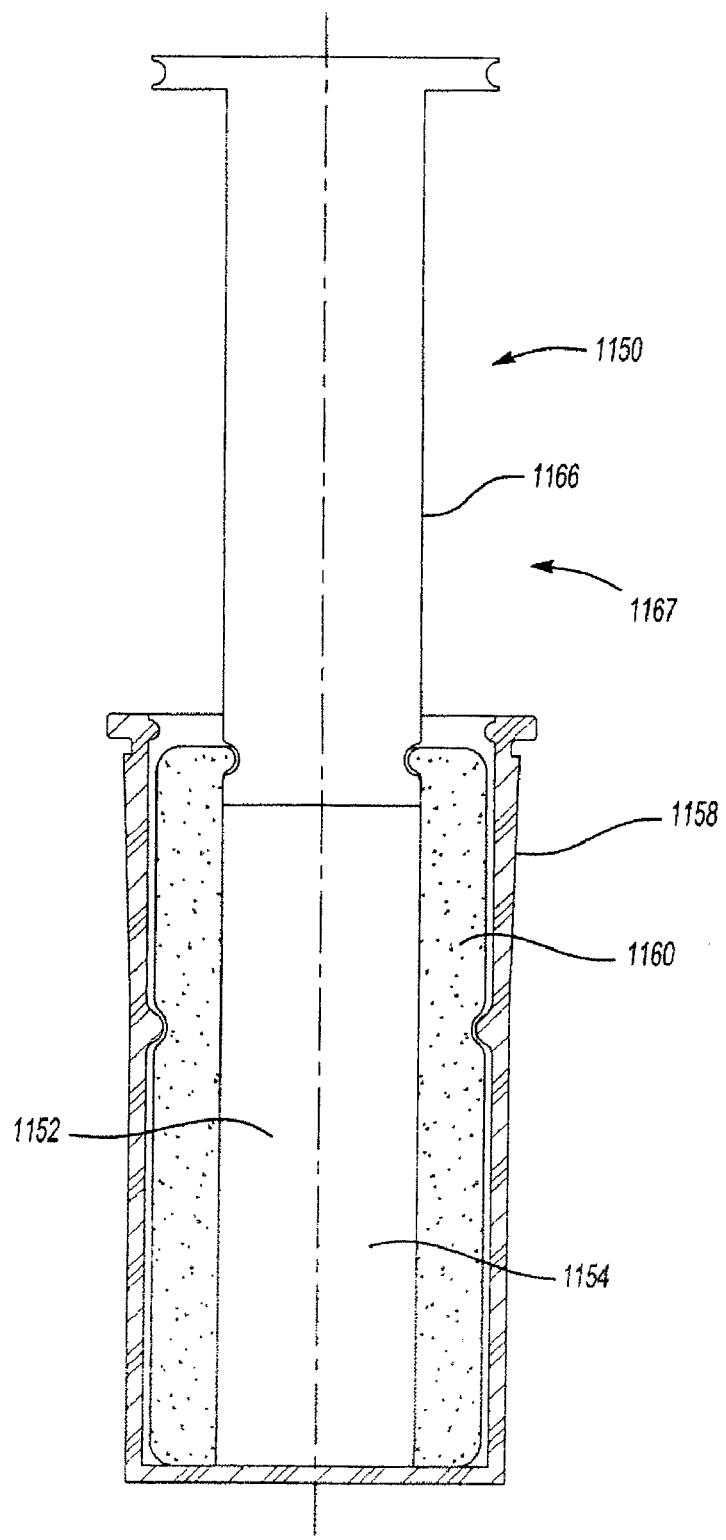

In FIG. 30, an assembly 1150 of the present invention is illustrated to have a first housing 1152 substantially defining and enclosing a first compartment 1154 and a second housing 1158 substantially enclosing a second compartment 1160 and substantially surrounding the first housing. The first housing 1152 is typically designed to fail during use. As an example, the first housings 1152 can be formed of a material such as thin glass or polyethylene, which is designed to shatter or break in multiple locations upon application of a force to the housing 1152. The assembly 1150 also includes a mixing initiator 1164 that includes a mixing member 1166 (e.g., a plunger).

The assembly 1150 can be employed to apply activatable material to a structure in a manner similar to or the same as previously described. As shown, the first component of the activatable material is located in the first compartment 1154 and the second component of the activatable material is located in the second compartment 1160, although the components may be otherwise arranged in the compartments. Preferably, at least one of the components (e.g., the second component) is a solid (e.g., compression molded granules of polyol or isocyanate or the like). Activation, for the assembly 1150 is typically accomplished by actuating the shaft member 1166 toward and/or into the first housing 1152 causing the first housing 1152 to fail (e.g., shatter, crack, break or the like) and allowing intermixing of the components of the activatable material (e.g., flow of the liquid component into the solid component). During activation, the expandable material can expand (e.g., foam) and exit the second housing 1158 as described for previous embodiments.

It is to be noted that one potential advantage of the present advantage is that the assemblies or system can be used to form baffle, seals and/or reinforcements at various different times. For example, the system can be employed before or after e-coat, e-coat bake, paint, paint bake or any combination thereof that are part of automobile or other article assembly and manufacture. The system can also be employed as an after market product (e.g., for creating seal, baffles or reinforcements for article such as vehicle that have already been sold by an original manufacturer).

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A system for forming a baffle, the system comprising:
   a structure of an automotive vehicle, the structure defining a cavity and having an opening for providing access to the cavity, wherein the structure is a pillar, header, frame rail, or vehicle seat cross-bar;
   a first housing; and
   a second housing defining an internal open space and substantially surrounding the first housing, wherein the first housing includes at least one wall dividing the open space into a first compartment and a second compartment wherein the at least one wall is non-cylindrical and includes weakened sections that fracture upon application of the force;
   a curing agent, a blowing agent or both located in the first compartment or the second compartment, the curing agent, the blowing agent or both including water, an isocyanate or both;
   a polymeric material located in the first compartment or the second compartment separate from the curing agent, the blowing agent or both;
   a movable member connected to the first housing, the movable member including a head and a mixer;
   wherein the movable member, upon rotation thereof, rotates the mixer, which applies a force upon the at least one wall thereby fracturing the wall and intermixing the polymeric material, the curing agent and the blowing agent to form an admixture that expands, foams, and cures to form a foam that functions as a baffle for the cavity, wherein the second housing fails by melting, dissolving or rupturing upon foaming of the admixture such that the intermixing takes place within the structure of the automotive vehicle so that the baffle cannot be removed from the structure of the automotive vehicle.

* * * * *